United States Patent
Suddaby

(10) Patent No.: US 12,472,075 B2
(45) Date of Patent: Nov. 18, 2025

(54) EXPANDABLE INTERVERTEBRAL FUSION IMPLANT

(71) Applicant: Loubert S. Suddaby, Orchard Park, NY (US)

(72) Inventor: Loubert S. Suddaby, Orchard Park, NY (US)

(*) Notice: Subject to any disclaimer, the term of this patent is extended or adjusted under 35 U.S.C. 154(b) by 775 days.

(21) Appl. No.: 17/752,927

(22) Filed: May 25, 2022

(65) Prior Publication Data

US 2022/0280310 A1 Sep. 8, 2022

Related U.S. Application Data

(63) Continuation-in-part of application No. 17/081,003, filed on Oct. 27, 2020.

(51) Int. Cl.
*A61F 2/44* (2006.01)
*A61F 2/30* (2006.01)

(52) U.S. Cl.
CPC .......... *A61F 2/4425* (2013.01); *A61F 2/4455* (2013.01); *A61F 2002/30332* (2013.01); *A61F 2002/30354* (2013.01); *A61F 2002/30383* (2013.01); *A61F 2002/30433* (2013.01); *A61F 2002/30525* (2013.01); *A61F 2002/443* (2013.01)

(58) Field of Classification Search
CPC ...... A61F 2/4455; A61F 2/4465; A61F 2/447; A61F 2/446; A61F 2002/30556; A61F 2002/30553; A61F 2002/30555; A61F 2002/30266; A61F 2002/30545
See application file for complete search history.

(56) References Cited

U.S. PATENT DOCUMENTS

| | | | |
|---|---|---|---|
| 3,922,726 A | 12/1975 | Trentani et al. | |
| 6,090,143 A | 7/2000 | Meriwether et al. | |
| 8,377,140 B2 * | 2/2013 | DeFalco | A61F 2/4611 254/98 |
| 9,474,626 B2 | 10/2016 | Jimenez et al. | |
| 10,117,755 B2 | 11/2018 | Emerick et al. | |
| 10,172,718 B2 | 1/2019 | Wolters et al. | |
| 11,207,192 B2 | 12/2021 | Suddaby | |

(Continued)

FOREIGN PATENT DOCUMENTS

EP 2368529 9/2019

*Primary Examiner* — Jan Christopher L Merene
(74) *Attorney, Agent, or Firm* — Harter Secrest & Emery LLP; Michael Nicholas Vranjes

(57) ABSTRACT

An expandable intervertebral fusion implant, including a base, an inferior component arranged on a first side of the base, a superior component arranged on a second side of the base, opposite the first side, a first worm rotatably arranged in the base and including a through-hole, a second worm rotatably arranged in the base, the second worm concentrically aligned with and spaced apart from the first worm, and an expansion mechanism, including a first screw extending between the base and the superior component, and a second screw non-rotatably connected to the first screw and extending between the base and the inferior component wherein as the first worm is rotated in a first circumferential direction, the first screw and the second screw rotate in a second circumferential direction and the inferior component and the superior component are displaced relative to the base.

19 Claims, 19 Drawing Sheets

(56) References Cited

U.S. PATENT DOCUMENTS

| | | |
|---|---|---|
| 2003/0065396 A1 | 4/2003 | Michelson |
| 2004/0186569 A1* | 9/2004 | Berry .................... A61F 2/4465 |
| | | 623/17.11 |
| 2006/0149385 A1 | 7/2006 | McKay |
| 2007/0198089 A1 | 8/2007 | Moskowitz et al. |
| 2007/0255407 A1* | 11/2007 | Castleman ................ A61F 2/44 |
| | | 606/279 |
| 2008/0140207 A1 | 6/2008 | Olmos et al. |
| 2011/0172716 A1* | 7/2011 | Glerum ................ A61F 2/4465 |
| | | 606/279 |
| 2011/0172774 A1 | 7/2011 | Varela |
| 2012/0109128 A1 | 5/2012 | Frigg |
| 2012/0323329 A1 | 12/2012 | Jimenez et al. |
| 2013/0158668 A1 | 6/2013 | Nichols et al. |
| 2013/0274883 A1 | 10/2013 | McLuen et al. |
| 2015/0094814 A1 | 4/2015 | Emerick et al. |
| 2016/0089247 A1 | 3/2016 | Nichols et al. |
| 2017/0071752 A1 | 3/2017 | McLuen et al. |
| 2017/0100258 A1 | 4/2017 | Jimenez et al. |
| 2017/0224505 A1 | 8/2017 | Butler et al. |
| 2018/0071110 A1 | 3/2018 | Overes |
| 2018/0360616 A1 | 12/2018 | Luu |
| 2019/0083279 A1 | 3/2019 | Suddaby |
| 2019/0388232 A1 | 12/2019 | Purcell et al. |
| 2020/0100905 A1 | 4/2020 | Sharifi-Mehr et al. |
| 2020/0405499 A1 | 12/2020 | Gerbec et al. |
| 2021/0378832 A1 | 12/2021 | Altarac et al. |
| 2023/0363923 A1* | 11/2023 | Eisermann .............. A61F 2/447 |

\* cited by examiner

EXPANDABLE INTERVERTEBRAL FUSION IMPLANT

CROSS-REFERENCE TO RELATED APPLICATIONS

This application is filed under 35 U.S.C. § 120 as a continuation-in-part of U.S. patent application Ser. No. 17/081,003, filed on Oct. 27, 2020, which reference is hereby incorporated by reference in its entirety.

FIELD

The present disclosure relates to orthopedic surgery, and more particularly to an expandable and deployable intervertebral fusion implant capable of being placed within an intervertebral disc space and expanded.

BACKGROUND

The spinal column, or backbone, is one of the most important parts of the body. It provides the main support, allowing us to stand upright, bend, and twist. As shown in FIG. 1, thirty three (33) individual bones interlock with each other to form the spinal column. The vertebrae are numbered and divided into regions. The cervical vertebrae C1-C7 form the neck, support the head and neck, and allow nodding and shaking of the head. The thoracic vertebrae T1-T12 join with the ribs to form the rib cage. The five lumbar vertebrae L1-L5 carry most of the weight of the upper body and provide a stable center of gravity when a person moves. Five vertebrae of the sacrum S and four of the coccyx C are fused. This comprises the back wall of the pelvis. Intervertebral discs are located between each of the mobile vertebra. Intervertebral discs comprise a thick outer layer with a crisscrossing fibrous structure annulus A that surrounds a soft gel-like center, the nucleus N. Discs function like shock-absorbing springs. The annulus pulls the vertebral bodies together against the elastic resistance of the gel-filled nucleus. When we bend, the nucleus acts like a ball bearing, allowing the vertebral bodies to roll over the incompressible gel. Each disc works in concert with two facet joints, forming a spinal motion segment. The biomechanical function of each pair of facet joints is to guide and limit the movement of the spinal motion segment. The surfaces of the joint are coated with cartilage that helps each joint move smoothly. Directly behind the discs, the ring-like vertebral bodies create a vertical tunnel called the spinal canal or neuro canal. The spinal cord and spinal nerves pass through the spinal canal, which protects them from injury. The spinal cord is the major column of nerve tissue that is connected to the brain and serves as an information super-highway between the brain and the body. The nerves in the spinal cord branch off to form pairs of nerve roots that travel through the small openings between the vertebrae and the intervertebral foramens.

Various medical conditions require a surgeon to repair, remove and/or replace the aforementioned discs. For example, in one surgical procedure, known as a discectomy (or diskectomy) with interbody fusion, the surgeon removes the nucleus of the disc and replaces it with an implant. As shown in FIG. 2, it may be necessary, for example, for the surgeon to remove the nucleus of the disc between the L3 and L4 vertebrae. Disc $D_{L3-L4}$ is shown in an enlarged view in FIG. 3. This figure also shows various anatomical structures of the spine, including facets F3A and F4A, facet joint FJ, spinous processes SP3 (not shown) and SP4, transverse processes TP3A and TP4A, and intervertebral foramen IF. FIG. 4 is a top view of the section of the spinal column shown in FIG. 3, with the L3 vertebra removed to expose annulus A and nucleus N of disc $D_{L3-L4}$. Neural canal NC is also shown. FIG. 5 is an anterior perspective view of the section of the spinal column shown in FIG. 4. FIG. 6 is a partial cross-sectional view of the section of the spinal column shown in FIG. 5, taken generally along line 6-6, but with vertebra L3 in place atop disc $D_{L3-L4}$.

Of all animals possessing a backbone, human beings are the only creatures who remain upright for significant periods of time. From an evolutionary standpoint, this erect posture has conferred a number of strategic benefits, not the least of which is freeing the upper limbs for purposes other than locomotion. From an anthropologic standpoint, it is also evident that this unique evolutionary adaptation is a relatively recent change, and as such has not benefitted from natural selection as much as have backbones held in a horizontal attitude. As a result, the stresses acting upon the human backbone (or "vertebral column"), are unique in many senses, and result in a variety of problems or disease states that are peculiar to the human species.

The human vertebral column is essentially a tower of bones held upright by fibrous bands called ligaments and contractile elements called muscles. There are seven bones in the neck or cervical region, twelve in the chest or thoracic region, five in the lower back or lumbar region, and five in the pelvic or sacral region, which are normally fused together to form the back part of the pelvis. This column of bones is critical for providing structural support for the entire body.

Between the vertebral bones themselves exist soft tissue structures, i.e., discs, composed of fibrous tissue and cartilage that are compressible and act as shock absorbers for sudden downward forces on the upright column. The discs allow the bones to move independently of each other, as well. The repetitive forces which act on these intervertebral discs during repetitive activities of bending, lifting, and twisting cause them to break down or degenerate over time.

Presumably, because of humans' upright posture their intervertebral discs have a high propensity to degenerate. Overt trauma or covert trauma, occurring in the course of repetitive activities, disproportionately affects the more highly mobile areas of the spine. Disruption of a disc's internal architecture leads to bulging, herniation, or protrusion of pieces of the disc and eventual disc space collapse. Resulting mechanical and even chemical irritation of surrounding neural elements (spinal cord and nerves) cause pain, attended by varying degrees of disability. In addition, loss of disc space height relaxes tension on the longitudinal spinal ligaments, thereby contributing to varying degrees of spinal movement.

The time-honored method of addressing the issues of neural irritation and instability resulting from severe disc damage has largely focused on removal of the damaged disc and fusing the adjacent vertebral elements together. Removal of the disc relieves the mechanical and chemical irritation of neural elements, while osseous union (i.e., bone knitting) solves the problem of stability.

While cancellous bone appears ideal to provide the biologic components necessary for osseous union to occur, it does not initially have the strength to resist the tremendous forces that may occur in the intervertebral disc space, nor does it have the capacity to adequately stabilize the spine until long term bony union occurs. For these reasons, many spinal surgeons have found that interbody fusion using bone alone has an unacceptably high rate of bone graft migration or even expulsion or nonunion due to structural failure of the bone or residual degrees of motion that retard or prohibit bony union. Intervertebral prosthesis in various forms has therefore been used to provide immediate stability and to protect and preserve an environment that fosters growth of the grafted bone such that a structurally significant bony fusion can occur.

Limitations of most present-day intervertebral implants are significant and revolve largely around the marked variation in the disc space height and shape that result from either biologic variability or pathologic change. For example, if a disc space is 20 mm in height, a circular implant bridging this gap requires a minimum diameter of 20 mm just to contact the end plate of the vertebral bone. Generally, end plate disruption must occur to allow a generous bony union, meaning that an additional 2-3 mm must be added on either side resulting in a final implant size of 24-26 mm. During implantation from an anterior approach (i.e., from the front of the body), excessive retraction (or pulling) is often required on the great blood vessels, which greatly enhances the risk of devastating complications such as vascular tears or thrombosis. On the other hand, during a posterior approach, large implant diameters may require excessive traction on neural elements for adequate placement, even if all posterior bony elements are removed. In some instances, an adequate implant size cannot be inserted posteriorly, particularly if there is a significant degree of distraction to obtain stability by tightening the annular ligamentous tension band. Compromising on implant size risks sub-optimal stability or a loose implant, which has a greater risk of migration within, or expulsion from, the disc space. The alternative of excessively retracting neural elements to facilitate a posterior implant application results in a neuropraxia at best and permanent neural damage at worst.

Thus, there is a long-felt need for an expandable and deployable intervertebral fusion implant capable of being placed within an intervertebral disc space and expanded.

SUMMARY

According to aspects illustrated herein, there is provided an expandable intervertebral fusion implant, comprising a base, including a first top surface, a first bottom surface, a first end including a first worm rotatably arranged therein, and a second end including a second worm rotatably arranged therein, an inferior component, including a second top surface operatively arranged to engage the first bottom surface, and a second bottom surface, a superior component, including a third top surface, a third bottom surface operatively arranged to engage the first top surface, and a first expansion mechanism, including a first screw comprising a first bottom end connected to the base and a first top end connected to the superior component, and a second screw comprising a second bottom end connected to the base and a second top end connected to the inferior component, wherein as the first worm is rotated in a first circumferential direction, the first screw and the second screw rotate in a second circumferential direction and the superior component and the inferior component are displaced relative to the base.

In some embodiments, the first worm comprises a radially outward facing surface comprising threading, and the first expansion mechanism further comprises gear engaged with the threading. In some embodiments, the first expansion mechanism further comprises a first sleeve threadably engaged with the first worm. In some embodiments, as the first screw rotates in the second circumferential direction, the first sleeve displaces relative to the base. In some embodiments, the first sleeve is pivotably connected to the superior component. In some embodiments, the first expansion mechanism further comprises a second sleeve threadably engaged with the first worm. In some embodiments, the second sleeve is pivotably connected to the inferior component.

In some embodiments, the second worm is spaced apart from the first worm. In some embodiments, the first worm comprises a through-hole. In some embodiments, the expandable intervertebral fusion implant further comprises a second expansion mechanism including a third screw comprising a third bottom end connected to the base and a third top end connected to the superior component, and a fourth screw comprising a fourth bottom end connected to the base and a fourth top end connected to the inferior component. In some embodiments, as the second worm is rotated in the first circumferential direction, the third screw and the fourth screw rotate in the second circumferential direction and the superior component and the inferior component are displaced relative to the base. In some embodiments, the first worm and the second worm are concentrically aligned. In some embodiments, the expandable intervertebral fusion implant further comprises a nut threadably engaged with the first screw, wherein the nut comprises a dome. In some embodiments, as the first screw rotates in the second circumferential direction, the nut displaces relative to the base.

According to aspects illustrated herein, there is provided an expandable intervertebral fusion implant, comprising an inferior component, including a first top surface, a first bottom surface, a first end including a first worm rotatably arranged therein, and a second end including a second worm rotatable arranged therein, a superior component, including a second top surface, a second bottom surface, a third end, and a fourth end, a first worm arranged between the inferior component and the superior component, a second worm concentrically aligned with the first worm and arranged between the inferior component and the superior component, an expansion mechanism, including a first screw comprising a first bottom end connected to the first worm and a first top end connected to the superior component, and a second screw comprising a second bottom end connected to the first worm and a second top end connected to the inferior component, the second screw being non-rotatably connected to the first screw, wherein as the first worm is rotated in a first circumferential direction, the first screw and the second screw rotate in a second circumferential direction and the superior component is displaced relative to the inferior component.

In some embodiments, the first worm comprises a radially outward facing surface comprising threading, and the expansion mechanism further comprises a gear non-rotatably connected to the first screw and the second screw and engaged with the threading. In some embodiments, the expansion mechanism further comprises a sleeve threadably engaged with the first worm, and as the first worm rotates in the first circumferential direction, the sleeve displaces axially relative to the first screw. In some embodiments, the first top end is pivotably connected to the superior component, and the second top end is pivotably connected to the inferior component. In some embodiments, the expansion mechanism further comprises a nut threadably engaged with the first worm, and the nut comprises a dome.

According to aspects illustrated herein, there is provided an expandable intervertebral fusion implant, comprising a base, an inferior component arranged on a first side of the base, a superior component arranged on a second side of the base, opposite the first side, a first worm rotatably arranged in the base and including a through-hole, a second worm rotatably arranged in the base, the second worm concentrically aligned with and spaced apart from the first worm, and an expansion mechanism, including a first screw extending between the base and the superior component, and a second screw non-rotatably connected to the first screw and extending between the base and the inferior component, wherein as the first worm is rotated in a first circumferential direction, the first screw and the second screw rotate in a second circumferential direction and the inferior component and the superior component are displaced relative to the base.

According to aspects illustrated herein, there is provided an expandable intervertebral fusion implant, comprising an inferior component, including a first top surface, a first bottom surface, a first end including a first worm rotatably arranged therein, and a second end including a second worm rotatable arranged therein, a superior component, including a second top surface, a second bottom surface, a third end, and a fourth end, and a first expansion mechanism including a first screw, the first screw comprising a first bottom end connected to the inferior component and a first top end connected to the superior component, wherein as the first worm is rotated in a first circumferential direction, the first screw rotates in a second circumferential direction and the superior component is displaced relative to the inferior component.

In some embodiments, the first worm comprises a radially outward facing surface comprising threading, and the first expansion mechanism further comprises a first bevel gear engaged with the threading. In some embodiments, the first expansion mechanism further comprises a first sleeve threadably engaged with the first worm. In some embodiments, as the first screw rotates in the second circumferential direction, the first sleeve displaces relative to the inferior component. In some embodiments, the first sleeve is pivotably connected to the superior component. In some embodiments, the superior component further comprises a frusto-conical hole extending from the second bottom surface, and the first sleeve engages the frusto-conical hole. In some embodiments, the second worm is spaced apart from the first worm. In some embodiments, the first worm comprises a through-hole. In some embodiments, the expandable intervertebral fusion implant further comprises a second expansion mechanism including a second screw, the second screw comprising a second bottom end connected to the inferior component and a second top end connected to the superior component. In some embodiments, as the second worm is rotated in the first circumferential direction, the second screw rotates in the second circumferential direction and the superior component is displaced relative to the inferior component. In some embodiments, the first worm and the second worm are concentrically aligned. In some embodiments, the expandable intervertebral fusion implant further comprises a section extending from one of the inferior component and the superior component and a groove arranged in the other of the inferior component and the superior component, the section being engaged with the groove.

According to aspects illustrated herein, there is provided an expandable intervertebral fusion implant, comprising an inferior component, including a first top surface, a first bottom surface, a first end including a first worm rotatably arranged therein, and a second end including a second worm rotatable arranged therein, a superior component, including a second top surface, a second bottom surface, a third end, and a fourth end, a first expansion mechanism including a first screw, the first screw comprising a first bottom end connected to the inferior component and a first top end connected to the superior component, and a second expansion mechanism including a second screw, the second screw comprising a second bottom end connected to the inferior component and a second top end connected to the superior component, wherein as the first worm is rotated in a first circumferential direction, the first screw rotates in a second circumferential direction and the superior component is displaced relative to the inferior component, and as the second worm is rotated in the first circumferential direction, the second screw rotates in the second circumferential direction and the superior component is displaced relative to the inferior component.

In some embodiments, the first worm comprises a radially outward facing surface comprising threading, and the first expansion mechanism further comprises a first bevel gear arranged at the first bottom end engaged with the threading. In some embodiments, the first expansion mechanism further comprises a first sleeve threadably engaged with the first worm, and as the first screw rotates in the second circumferential direction, the first sleeve displaces relative to the inferior component. In some embodiments, the first top end is pivotably connected to the superior component. In some embodiments, the superior component further comprises a frusto-conical hole extending from the second bottom surface, and the first screw engages the frusto-conical hole. In some embodiments, the second worm is spaced apart from the first worm, and the first worm and the second worm are concentrically aligned. In some embodiments, the first worm comprises a through-hole.

According to aspects illustrated herein, there is provided an expandable intervertebral fusion implant, comprising an inferior component, including a first top surface, a first bottom surface, a superior component, including a second top surface, a second bottom surface including a first frusto-conical hole and a second frusto-conical hole, a first worm including a through-hole, a second worm spaced apart from the first worm, a first expansion mechanism including a first screw engaged with the first worm and the first frusto-conical hole, the first screw comprising a first bottom end connected to the inferior component and a first top end pivotably connected to the superior component, and a second expansion mechanism including a second screw engaged with the second worm and the second frusto-conical hole, the second screw comprising a second bottom end connected to the inferior component and a second top end pivotably connected to the superior component, wherein as the first worm is rotated in a first circumferential direction, the first screw rotates in a second circumferential direction and the superior component is displaced away from the inferior component, and as the second worm is rotated in the first circumferential direction, the second screw rotates in the second circumferential direction and the superior component is displaced away from the inferior component.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
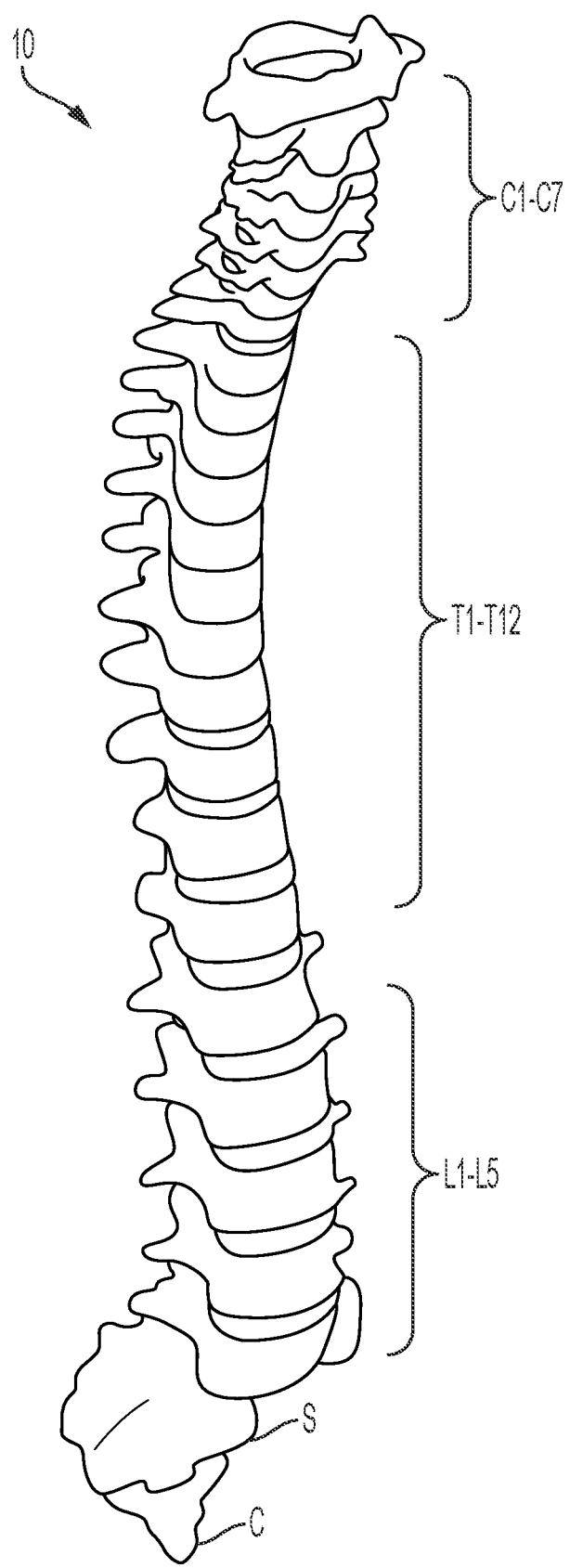
FIG. 1 is an anterior perspective view of a spinal column.
Figure 2:
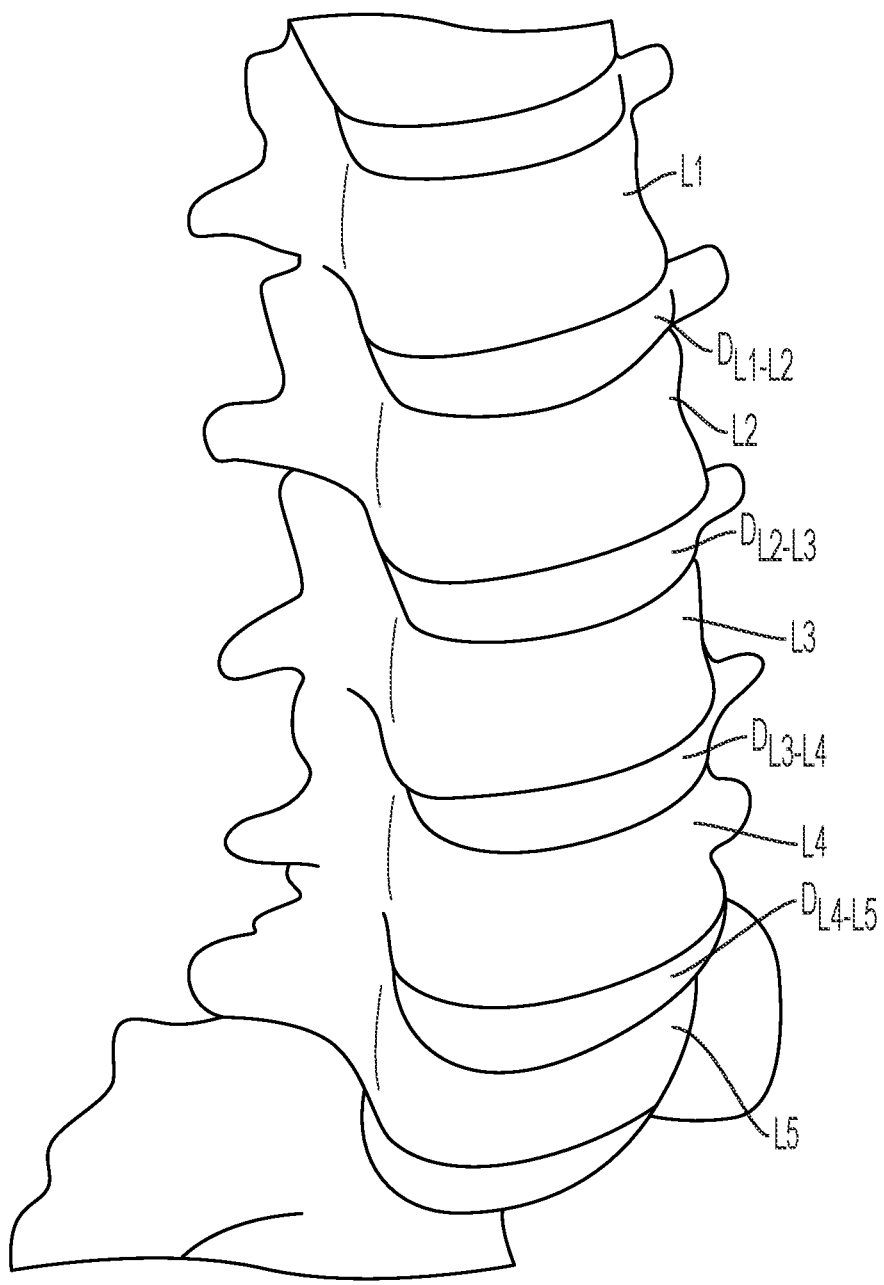
FIG. 2 is an anterior perspective view of the lumbar section of the spinal column shown in FIG. 1.
Figure 3:
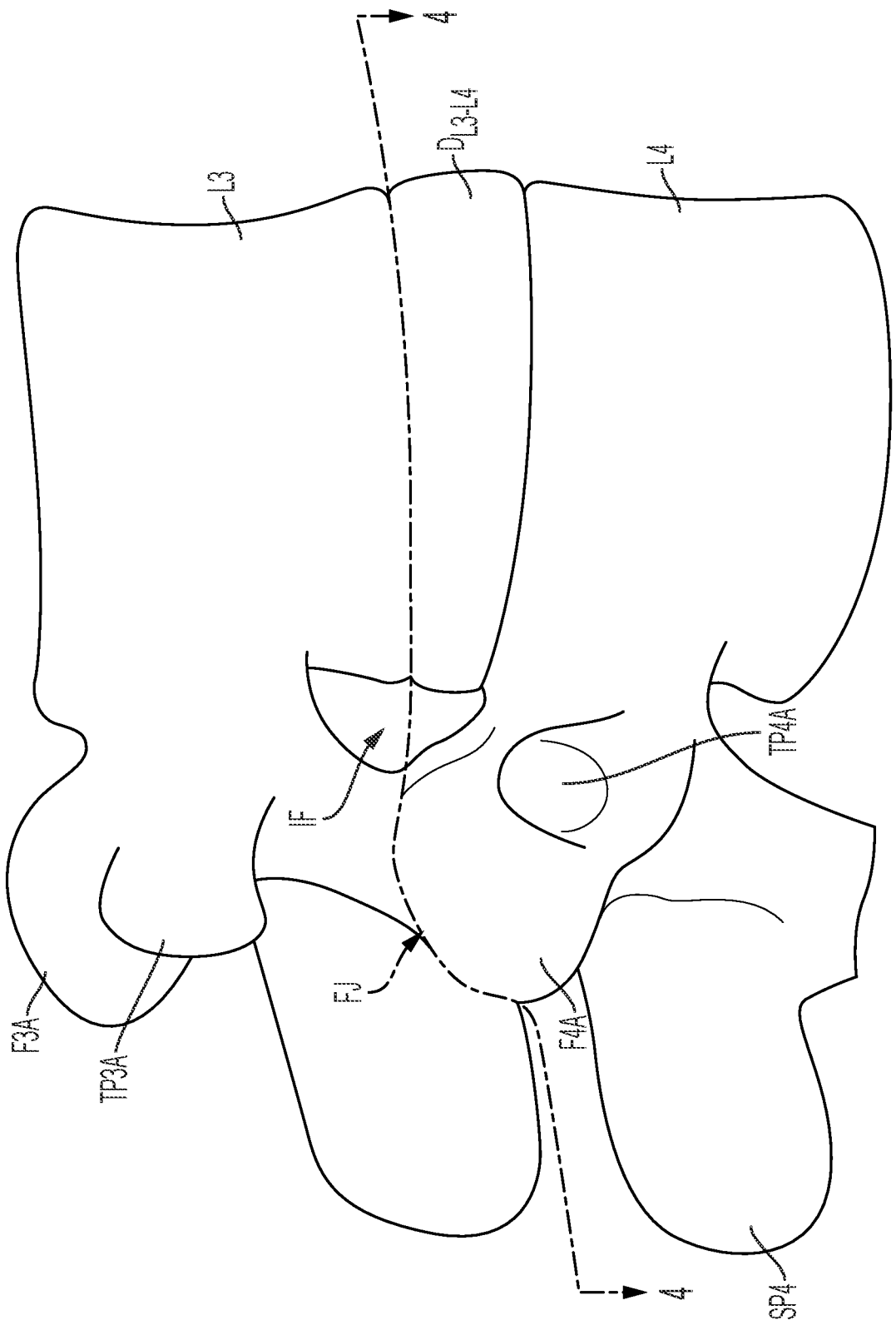
FIG. 3 is a lateral perspective view of two vertebrae, a disc, and related spinal anatomy.
Figure 4:
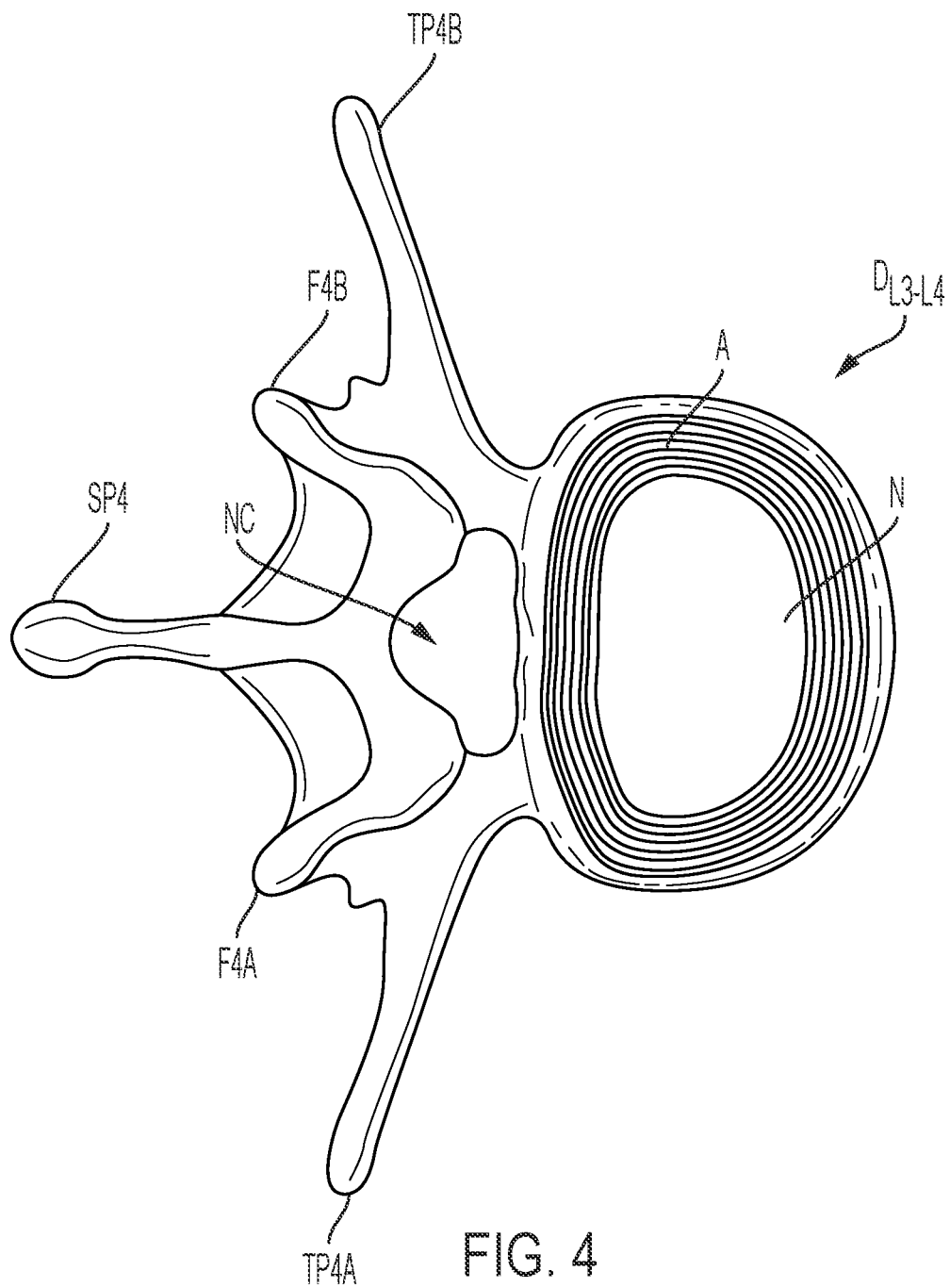
FIG. 4 is a top view of a section of the spinal column, taken generally along line 4-4 in FIG. 3.
Figure 5:
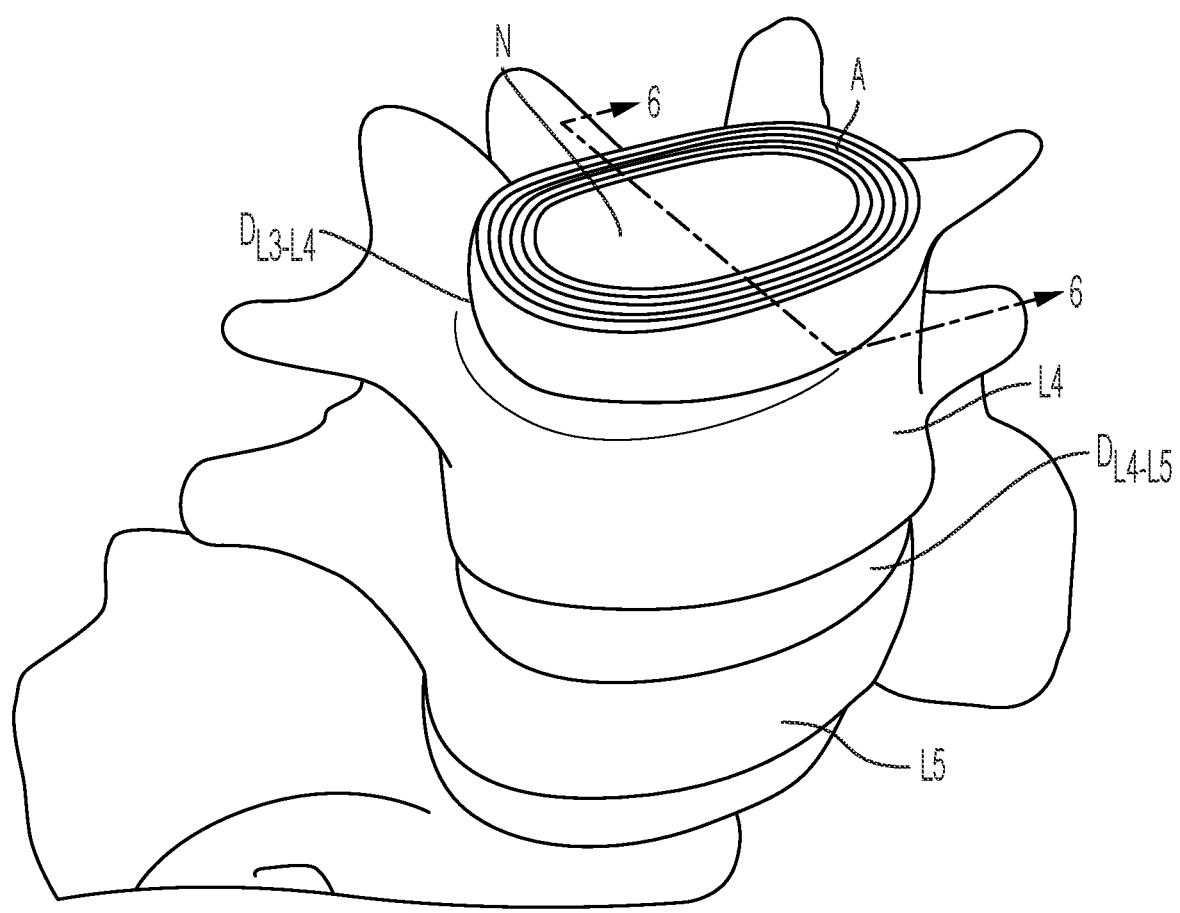
FIG. 5 is an enlarged anterior perspective view of the spinal column shown in FIG. 2, except with the top vertebra and all other structure above the top vertebra removed.
Figure 6:
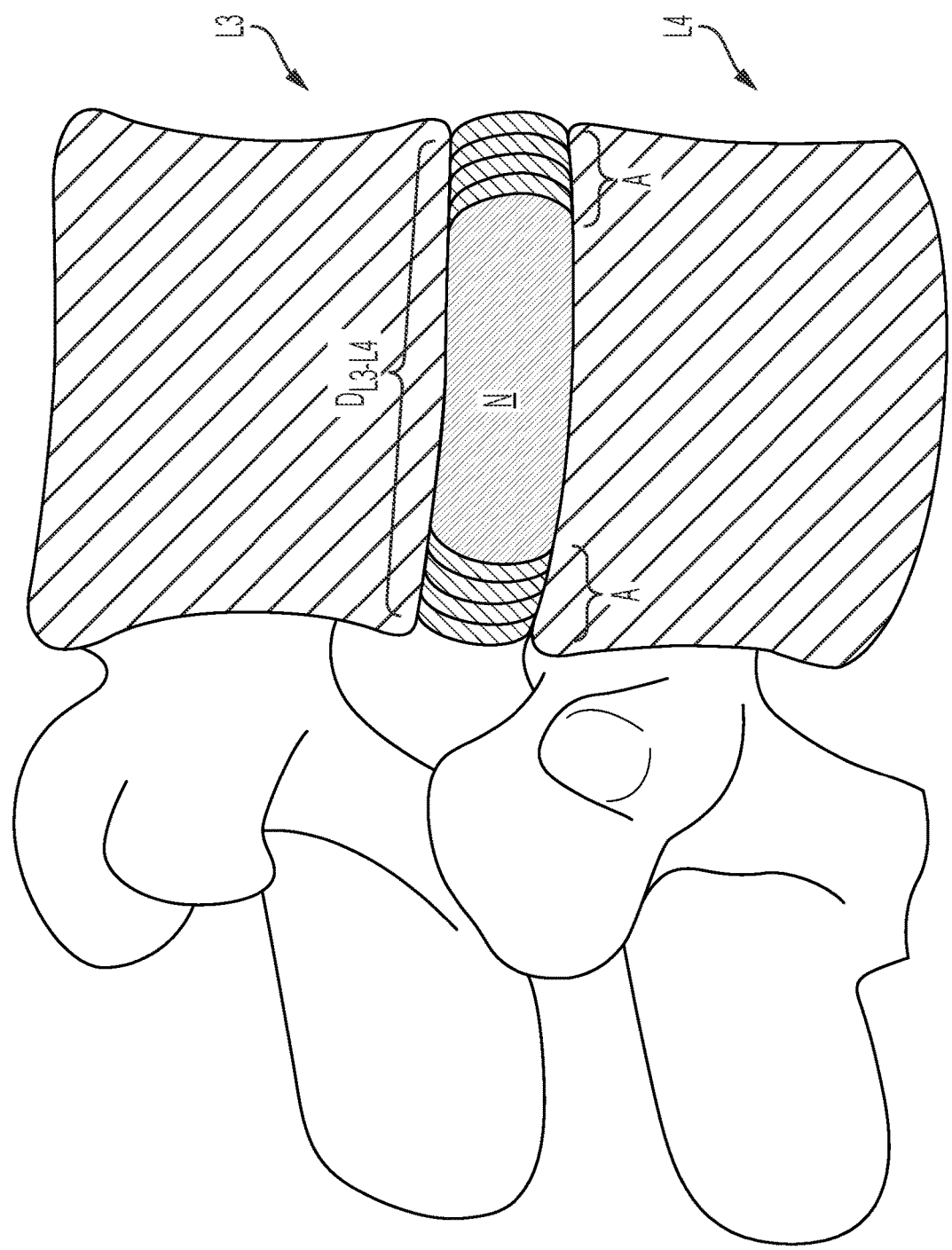
FIG. 6 is a partial cross-sectional view of the top and bottom vertebrae and disc, taken generally along line 6-6 in FIG. 5.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item xis both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

By "non-rotatably connected" elements, we mean that: the elements are connected so that whenever one of the elements rotate, all the elements rotate; and, relative rotation between the elements is not possible. Radial and/or axial movement of non-rotatably connected elements with respect to each other is possible, but not required. By "rotatably connected" elements, we mean that: the elements are rotatable with respect to each other; and, whenever one element is displaced radially and/or axially, all the elements are displaced radially and/or axially.

Adverting now to the figures, and as described previously, FIGS. 1-6 depict various parts and sections of spinal anatomy.

Figure 7A:
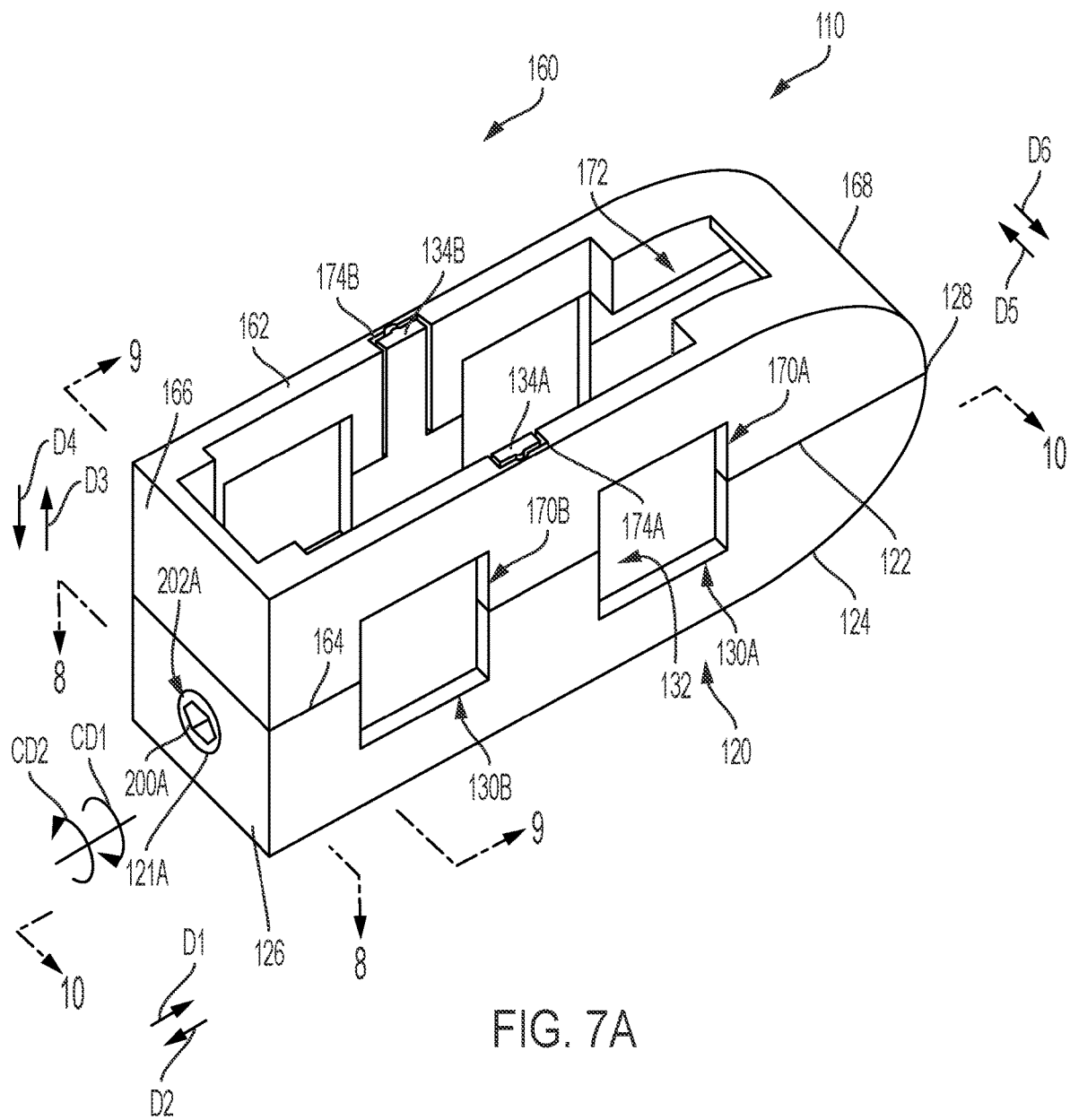
FIG. 7A is a front perspective view of an expandable intervertebral fusion implant, in a collapsed state.
Figure 7B:
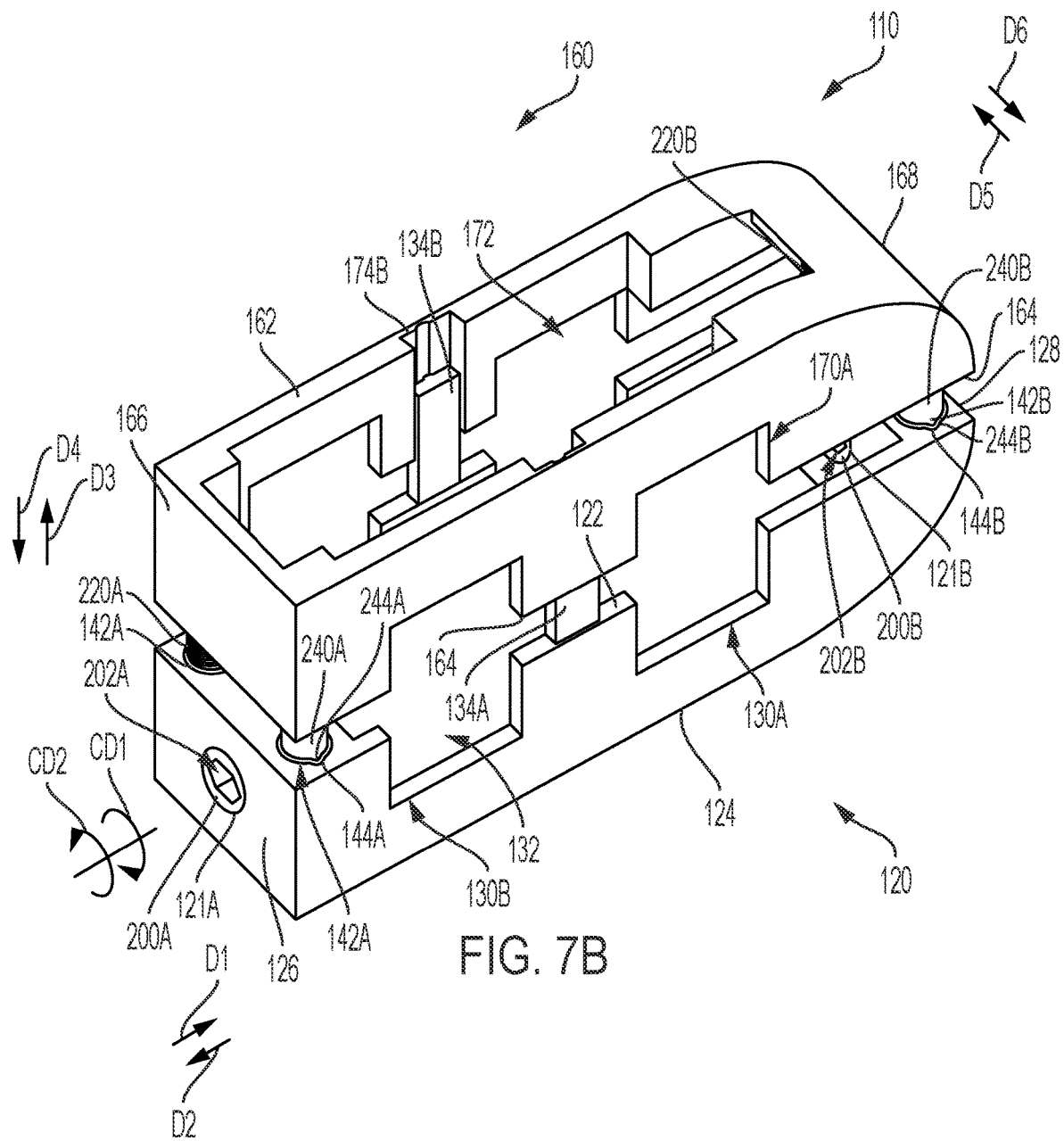
FIG. 7B is a front perspective view of the expandable intervertebral fusion implant shown in FIG. 7A, in an expanded state.
Figure 8:
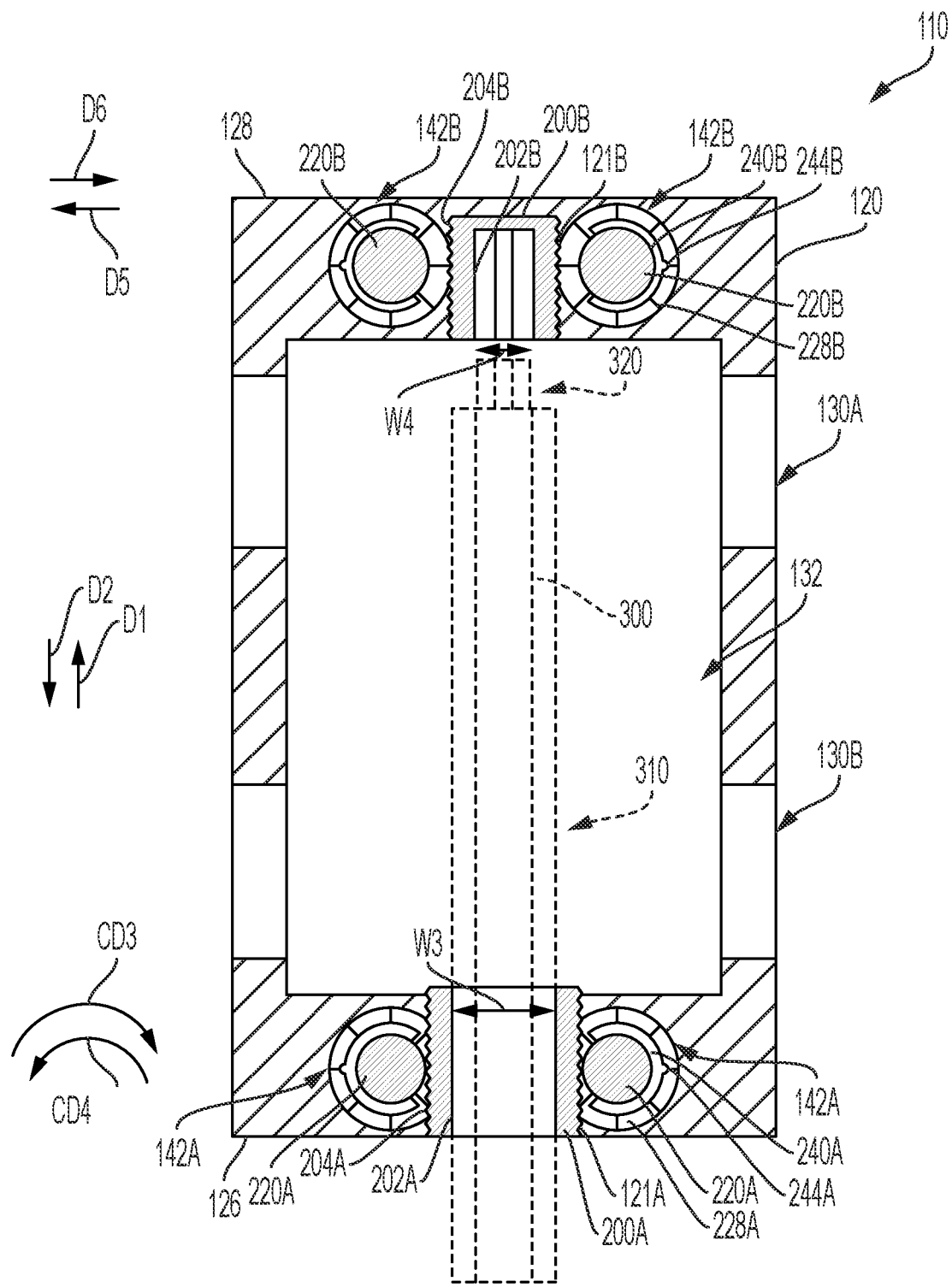
FIG. 8 is a cross-sectional view of the expandable intervertebral fusion implant taken generally along line 8-8 in FIG. 7A.
Figure 9:
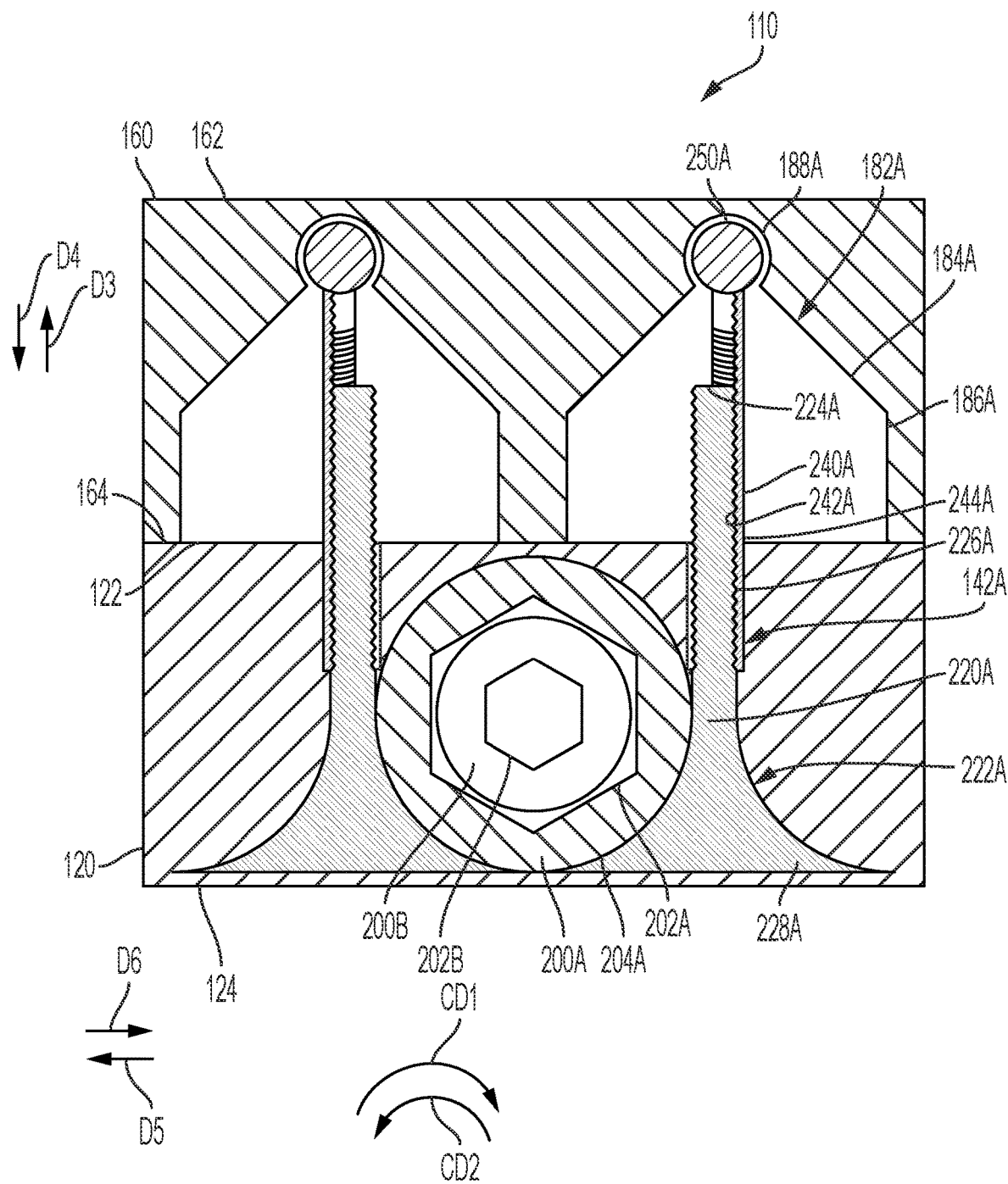
FIG. 9 is a cross-sectional view of the expandable intervertebral fusion implant taken generally along line 9-9 in FIG. 7A.
Figure 10:
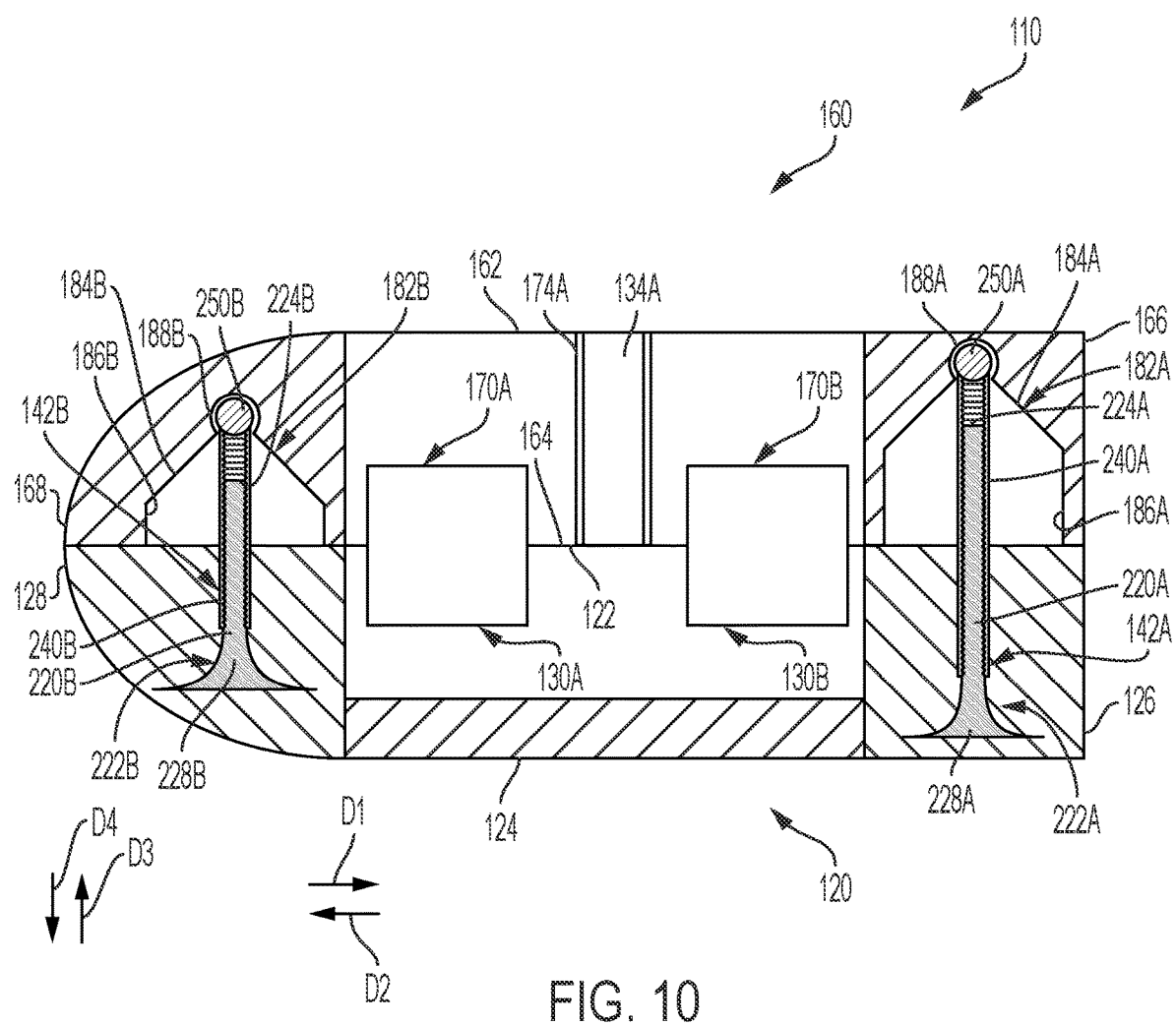
FIG. 10 is a cross-sectional view of the expandable intervertebral fusion implant taken generally along line 10-10 in FIG. 7A.

FIG. 7A is a front perspective view of expandable intervertebral fusion implant 110, in a collapsed state. FIG. 7B is a front perspective view of expandable intervertebral fusion implant 110, in an expanded state. FIG. 8 is a cross-sectional view of expandable intervertebral fusion implant 110 taken generally along line 8-8 in FIG. 7A. FIG. 9 is a cross-sectional view of expandable intervertebral fusion implant 110 taken generally along line 9-9 in FIG. 7A. FIG. 10 is a cross-sectional view of expandable intervertebral fusion implant 110 taken generally along line 10-10 in FIG. 7A. Expandable intervertebral fusion implant 110 generally comprises inferior component 120, superior component 160, and at least one expansion mechanism, for example, a worm drive comprising worm 200A and/or worm 200B and screw 220A and/or screw 220B, respectively. The following description should be read in view of FIGS. 7A-10.

Inferior component 120 comprises top surface 122, bottom surface 124, end 126, and end 128. Top surface 122 is an interior surface of expandable intervertebral fusion implant 110 that generally faces superior component 160 and is operatively arranged to engage and/or abut against surface 164. Bottom surface 124 is an exterior surface of expandable intervertebral fusion implant 110 that generally faces away from superior component 160 and is operatively arranged to engage and/or abut against a vertebra, as will be described in greater detail below. In some embodiments, surface 122 is arranged parallel to surface 124. In some embodiments, surface 122 is arranged nonparallel to surface 124. In some embodiments, surface 124 is curvilinear, for example, proximate end 128.

In some embodiments, inferior component 120 further comprises one or more holes. For example, inferior component 120 comprises hole 121A, which extends from end 126. Hole 121A extends from end 126 in direction D1 and is arranged to house worm 200A, as will be described in greater detail below. Inferior component 120 comprises hole 121B arranged proximate end 128. Hole 121B is arranged to house worm 200B, as will be described in greater detail below. In some embodiments, hole 121B is equal in size (e.g., diameter) to hole 121A. In some embodiments, hole 121B is not equal in size to hole 121A. Inferior component 120 comprises holes 130A and 130B, which extend through inferior component 120 in direction D5. Holes 130A-B extend from surface 122 in direction D4. Inferior component 120 comprises hole 132, which extends from surface 122 to surface 124. In some embodiments, hole 132 may instead be a plurality of holes, not just one. Holes 130A-B and 132 are operatively arranged to allow bone fusion material, which may be injected within expandable intervertebral fusion implant 110 once implanted within a spinal column, to engage adjacent vertebra thereby encouraging bony fusion. As such, it should be appreciated that any number of holes of any number of geometric shapes can be arranged in inferior component 120. Hole 121A is operatively arranged to allow for the injection of bone material. As will be described in greater detail below, worm 200A is arranged in hole 121A and comprises through-hole 202A. Once expandable intervertebral fusion implant 110 is implanted, bone material can be injected therein via hole 202A. Hole 121B may allow for fusion in some embodiments wherein worm 200B comprises a through-hole.

Inferior component 120 further comprises at least one section, for example section 134A and section 134B, which extends vertically from surface 122 in direction D3. Sections 134A and 134B are operatively arranged to slidingly and pivotably engage grooves 174A and 174B, respectively, to maintain alignment of inferior component 120 and superior component 160 in directions D1 and D2 while still allowing superior component 160 and inferior component 120 to pivot with respect to each other. In some embodiments, section 134A comprises a tongue or protrusion extending in direction D6 therefrom and section 134B comprises a tongue or protrusion extending in direction D5 therefrom (see FIG. 7A).

Inferior component 120 further comprises one or more holes, for example holes 142A and 142B. Hole 142A is generally arranged proximate end 126 and extends from surface 122 in direction D4. Hole 142A comprises a radially inward facing surface and engages screw 220A, as will be described in greater detail below. In some embodiments, hole 142A comprises notch 144A arranged proximate or at surface 122. Notch 144A is operatively arranged to engage with protrusion 244A to non-rotatably connect sleeve 240A and inferior component 120. In some embodiments, hole 142A comprises a cylindrical section that engages screw 220A and sleeve 240A and a tapered portion proximate surface 124 that engages bevel gear 228A (see FIGS. 9-10). Hole 142B is generally arranged proximate end 128 and extends from surface 122 in direction D4. Hole 142B comprises a radially inward facing surface and engages screw 220B, as will be described in greater detail below. In some embodiments, hole 142B comprises notch 144B arranged proximate or at surface 122. Notch 144B is operatively arranged to engage with protrusion 244B to non-rotatably connect sleeve 240B and inferior component 120. In some embodiments, hole 142B comprises a cylindrical section that engages screw 220B and sleeve 240B and a tapered portion proximate surface 124 that engages bevel gear 228B (see FIG. 10). It should be appreciated that in some embodiments, and as shown, inferior component 120 comprises two holes 142A arranged proximate end 126 to engage two screws 220A and two holes 142B arranged proximate end 128 to engage two screws 220B.

Superior component 160 comprises top surface 162, bottom surface 164, end 166, and end 168. Top surface 162 is an exterior surface of expandable intervertebral fusion implant 110 that generally faces away from inferior component 120 and is operatively arranged to engage and/or abut against a vertebra, as will be described in greater detail below. Bottom surface 164 is an interior surface of expandable intervertebral fusion implant 110 that generally faces inferior component 120 and is operatively arranged to engage and/or abut against surface 122, as will be described in greater detail below. In some embodiments, surface 162 is arranged parallel to surface 164. In some embodiments, surface 162 is arranged nonparallel to surface 164. In some embodiments, surface 162 is curvilinear, for example, proximate end 168.

In some embodiments, superior component 160 further comprises one or more holes. For example, superior component 160 comprises holes 170A and 170B, which extend through superior component 160 in direction D5. Holes 170A-B extend from surface 162 in direction D3. Superior component 160 comprises hole 172, which extends from surface 162 to surface 164. Holes 170A-B and 172 are operatively arranged to allow bone fusion material, which may be injected within expandable intervertebral fusion implant 110 once implanted within a spinal column, to engage adjacent vertebra thereby encouraging bony fusion. As such, it should be appreciated that any number of holes of any number of geometric shapes can be arranged in superior component 160. In some embodiments, superior component 160 further comprises one or more holes in end 166 and/or end 168.

Superior component 160 further comprises at least one groove, for example groove 174A and section 174B, which extends from surface 162 to surface 164. Grooves 174A and 174B are operatively arranged to slidingly and pivotably engage sections 134A and 134B, respectively, to maintain alignment of superior component 160 and inferior component 120 in directions D1 and D2 while still allowing superior component 160 and inferior component 120 to pivot with respect to each other. In some embodiments, groove 174A comprises an indentation or channel that is arranged to engage a tongue or protrusion of section 134A and groove 174B comprises an indentation or channel that is arranged to engage a tongue or protrusion of section 134B. Such arrangement allows the tongue or protrusion of section 134A, 134B to engage the indentation or channel of groove 174A, 174B such that superior component 160 can displace in direction D3 and direction D4 relative to section 134A, 134B, but cannot displace in direction D5 and direction D6, or direction D1 or direction D2, relative to section 134A, 134B and thus inferior component 120.

Superior component 160 further comprises one or more holes, for example holes 182A and 182B. Hole 182A is generally arranged proximate end 166 and extends from surface 164 in direction D3. Hole 182A comprises surface 184A and surface 186A, and engages screw 220A and sleeve 240A, as will be described in greater detail below. In some embodiments, hole 182A further comprises socket 188A operatively arranged to pivotably connect to ball 250A of screw 220A and/or sleeve 240A. In some embodiments, surface 184A is frusto-conical and decreases in diameter in direction D3. Such an arrangement allows superior component 160 to pivot with respect to inferior component 120 such that, for example, end 168 can be expanded to a greater height than that of end 166, or vice versa. In some embodiments, surface 186A is cylindrical. Socket 188A is operatively arranged to engage ball 250A of screw 220A to expand and contract expandable intervertebral fusion implant 110. Hole 182B is generally arranged proximate end 168 and extends from surface 164 in direction D3. Hole 182B comprises surface 184B and surface 186B, and engages screw 220B and sleeve 240B, as will be described in greater detail below. In some embodiments, hole 182B further comprises socket 188B operatively arranged to pivotably connect to ball 250B of screw 220B and/or sleeve 240B. In some embodiments, surface 184B is frusto-conical and decreases in diameter in direction D3. Such an arrangement allows superior component 160 to pivot with respect to inferior component 120 such that, for example, end 168 can be expanded to a greater height than that of end 166, or vice versa. In some embodiments, surface 186B is cylindrical. Socket 188B is operatively arranged to engage ball 250B of screw 220B to expand and contract expandable intervertebral fusion implant 110.

Worm 200A is generally cylindrical and operatively arranged to rotatably engage hole 142A (or holes 142A), and specifically, screw 220A (or screws 220A). Worm 200A comprises through-hole 202A and radially outward facing surface 204A. Radially outward facing surface 204A comprises threading arranged to engage bevel gear 228A. Worm 200A is rotatably connected to inferior component 120 via hole 121A, meaning worm 200A is capable of displacing circumferentially with respect to inferior component 120. Worm 200A is not capable of displacing axially, in directions D1 and D2, with respect to inferior component 120. Through-hole 202A is operatively arranged to be engaged by a tool in order to rotate worm 200A, for example tool 300, as will be described in greater detail below. Such head may comprise any drive type suitable for rotating worm 200A, for example, Phillips and Frearson, slotted, combination, socked, internal hex, Allen, torx, external hex, etc. However, it should be appreciated that hole 202A is a through-hole that allows not only bone material to be injected into expandable intervertebral fusion implant 110, but also access to worm 200B. As worm 200A is rotated, for example in circumferential direction CD1 or circumferential direction CD2, threading of radially outward facing surface 204A engages teeth on bevel gear 228A to displace screw 220A in circumferential direction CD3 or circumferential direction CD4, within hole 142A.

Screw 220A comprises end 222A, 224A, and radially outward facing surface 226A. End 222A engages inferior component 120 and end 224A engages superior component 160. Radially outward facing surface 226A comprises threading operatively arranged to engage with threading of sleeve 240A, as will be described in greater detail below. Screw 220A further comprises bevel gear 228A connected to end 222A. As is known in the art, bevel gear 228A is operatively arranged to engage threading of radially outward facing surface 204A (of worm 200A). This engagement creates a worm drive, meaning that as worm 200A is rotated in circumferential direction CD1 or circumferential direction CD2, threading of radially outward facing surface 204A engages teeth on bevel gear 228A, which displaces screw 220A in circumferential direction CD3 or circumferential direction CD4 within hole 142A. In some embodiments, bevel gear 228A is fixedly secured to screw 220A. In some embodiments, bevel gear 228A and screw 220A are integrally formed.

Sleeve 240A is generally cylindrical, is rotatably connected to screw 220A at end 224A, and is connected to superior component 160. Sleeve 240A comprises radially inward facing surface 242A and protrusion or key 244A. Radially inward facing surface 242A comprises threading that engages threading on radially outward facing surface 226A of screw 220A. As previously described, protrusion 244A engages notch 144A in inferior component 120. As screw 220A is displaced in circumferential direction CD3 or circumferential direction CD4, as a result of worm 200A being displaced in circumferential direction CD1 or circumferential direction CD2, sleeve 240A displaces in direction D3 or direction D4 relative to screw 220A, thereby displacing superior component 160 in direction D3 and direction D4 relative to inferior component 120. In some embodiments, sleeve 240A comprises ball 250A operatively arranged to pivotably engage superior component 160, specifically, socket 188A. Such "ball and socket" joint connection allows for pivotable movement of superior component 160 relative to inferior component 120. In some embodiments, sleeve 240A only partially surrounds screw 220A. In some embodiments, sleeve 240A completely circumscribes screw 220A. Sleeve 240A may also protect screw 220A and hole 142A from ingrowth of foreign materials (e.g., tissue, bone fusion material, etc.).

Screw 220A and sleeve 240A are capable of displacing within hole 142A. Specifically, screw 220A is capable of displacing in circumferential directions CD3 and CD4 relative to inferior component 120 and sleeve 240A is capable of displacing in directions D3 and D4 relative to inferior component 120. The engagement of worm 200A and screw 220A (i.e., bevel gear 228A) operates similar to a worm drive, wherein rotational displacement of worm 200A causes rotational displacement of screw 220A and linear displacement of sleeve 240A. As such, when worm 200A is rotated in a first rotational direction, screw 220A is displaced within hole 142A such that sleeve 240A and superior component 160 are displaced in direction D3 relative to inferior component 120, expanding expandable intervertebral fusion implant 110. When worm 200A is rotated in a second rotational direction, opposite the first rotational direction, screw 220A is displaced within hole 142A such that sleeve 240A and superior component 160 are displaced in direction D4 relative to inferior component 120, contracting expandable intervertebral fusion implant 110. It should be appreciated that while the drawings illustrate only one worm 200A arranged to engage two screws 220A at the same time, in some embodiments expandable intervertebral fusion implant 110 may comprise two worms 200A that independently engage the two screws 220A. Such an arrangement would allow for each corner (of end 166) to be expanded/contracted independently of each other.

Worm 200B is generally cylindrical and operatively arranged to rotatably engage hole 142B (or holes 142B), and specifically, screw 220B (or screws 220B). Worm 200B comprises hole 202B and radially outward facing surface 204B. In some embodiments, hole 202B is a through-hole. In some embodiments, hole 202B is not a through-hole. Radially outward facing surface 204B comprises threading arranged to engage bevel gear 228B. Worm 200B is rotatably connected to inferior component 120 via hole 121B, meaning worm 200B is capable of displacing circumferentially with respect to inferior component 120. Worm 200A is not capable of displacing axially, in directions D1 and D2, with respect to inferior component 120. Hole 202B is operatively arranged to be engaged by a tool in order to rotate worm 200B, for example tool 300, as will be described in greater detail below. Such head may comprise any drive type suitable for rotating worm 200B, for example, Phillips and Frearson, slotted, combination, socked, internal hex, Allen, torx, external hex, etc. As worm 200B is rotated, for example in circumferential direction CD1 or circumferential direction CD2, threading of radially outward facing surface 204B engages teeth on bevel gear 228B to displace screw 220B in circumferential direction CD3 or circumferential direction CD4, within hole 142B.

Screw 220B comprises end 222B, 224B, and radially outward facing surface 226B. End 222B engages inferior component 120 and end 224B engages superior component 160. Radially outward facing surface 226B comprises threading operatively arranged to engage with threading of sleeve 240B, as will be described in greater detail below. Screw 220B further comprises bevel gear 228B connected to end 222B. As is known in the art, bevel gear 228B is operatively arranged to engage threading of radially outward facing surface 204B (of worm 200B). This engagement creates a worm drive, meaning that as worm 200B is rotated in circumferential direction CD1 or circumferential direction CD2, threading of radially outward facing surface 204B engages teeth on bevel gear 228B, which displaces screw 220B in circumferential direction CD3 or circumferential direction CD4 within hole 142B. In some embodiments, bevel gear 228B is fixedly secured to screw 220B. In some embodiments, bevel gear 228B and screw 220B are integrally formed.

Sleeve 240B is generally cylindrical, is rotatably connected to screw 220B at end 224B, and is connected to superior component 160. Sleeve 240B comprises radially inward facing surface 242B and protrusion or key 244B. Radially inward facing surface 242B comprises threading that engages threading on radially outward facing surface 226B of screw 220B. As previously described, protrusion 244B engages notch 144B in inferior component 120. As screw 220B is displaced in circumferential direction CD3 or circumferential direction CD4, as a result of worm 200B being displaced in circumferential direction CD1 or circumferential direction CD2, sleeve 240B displaces in direction D3 or direction D4 relative to screw 220B, thereby displacing superior component 160 in direction D3 and direction D4 relative to inferior component 120. In some embodiments, sleeve 240B comprises ball 250B operatively arranged to pivotably engage superior component 160, specifically, socket 188B. Such "ball and socket" joint connection allows for pivotable movement of superior component 160 relative to inferior component 120. In some embodiments, sleeve 240B only partially surrounds screw 220B. In some embodiments, sleeve 240B completely circumscribes screw 220B. Sleeve 240B may also protect screw 220B and hole 142B from ingrowth of foreign materials (e.g., tissue, bone fusion material, etc.).

Screw 220B and sleeve 240B are capable of displacing within hole 142B. Specifically, screw 220B is capable of displacing in circumferential directions CD3 and CD4 relative to inferior component 120 and sleeve 240B is capable of displacing in directions D3 and D4 relative to inferior component 120. The engagement of worm 200B and screw 220B (i.e., bevel gear 228B) operates similar to a worm drive, wherein rotational displacement of worm 200B causes rotational displacement of screw 220B and linear displacement of sleeve 240B. As such, when worm 200B is rotated in a first rotational direction, screw 220B is displaced within hole 142B such that sleeve 240B and superior component 160 are displaced in direction D3 relative to inferior component 120, expanding expandable intervertebral fusion implant 110. When worm 200B is rotated in a second rotational direction, opposite the first rotational direction, screw 220B is displaced within hole 142B such that sleeve 240B and superior component 160 are displaced in direction D4 relative to inferior component 120, contracting expandable intervertebral fusion implant 110. It should be appreciated that while the drawings illustrate only one worm 200B arranged to engage two screws 220B at the same time, in some embodiments expandable intervertebral fusion implant 110 may comprise two worms 200B that independently engage the two screws 220B. Such an arrangement would allow for each corner (of end 168) to be expanded/contracted independently of each other.

It should be appreciated that in some embodiments, expandable intervertebral implant 110 comprises one or more expansion mechanisms, for example, four worm drives and four screws. Specifically, and as shown, inferior component 120 comprises two worms, namely, worms 200A and 200B, and four screws, namely, screws 220A engaged with worm 200A and screws 220B engaged with worm 200B. The arrangement of the expansion mechanisms as well as the pivotable connection of the screws/sleeves to the superior component (i.e., the ball and socket joints) allows for a user to individually expand each end of expandable intervertebral implant 110 to the desired height. In other words, surface 162 need not be parallel to surface 124, which allows for a more custom expansion of expandable intervertebral implant 110. Furthermore, and as previously described, in some embodiments, each of the four screws comprises its own worm. In such embodiments, a user can individually expand each corner of expandable intervertebral implant 110 to the desired height.

Figure 11:
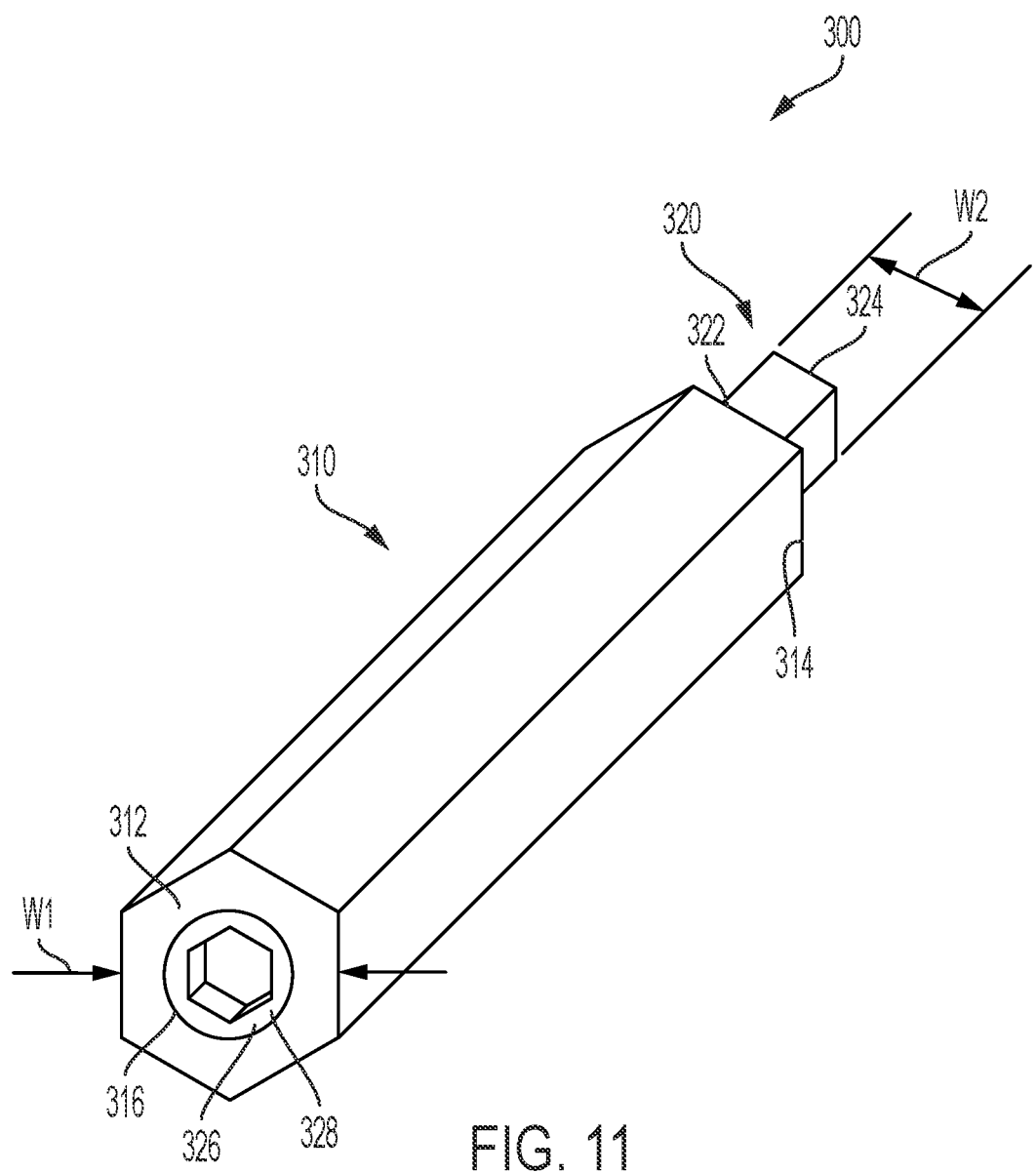
FIG. 11 is a perspective view of a tool used for expanding and collapsing the expandable intervertebral fusion implant shown in FIG. 7A.

FIG. 11 is a perspective view of tool 300 used for expanding and collapsing expandable intervertebral fusion implant 110. Tool 300 comprises section 310 and section 320. Section 310 comprises proximal end 312 and distal end 322. Section 320 is connected to distal end 322 of section 310 and comprises end 322 and end 324. Section 312 is hexagonal (i.e., an Allen wrench) and comprises width W1. Width W1 is measured across-flats (AF), which is the distance between two opposite parallel flat sides of the key. Section 320 is hexagonal and end 324 comprises width W2. Width W2 is measured AF. In some embodiments, width W2 is less than width W1. In some embodiments, width W2 is equal to width W1. As best shown in FIG. 8, tool 300 is operatively arranged to engage both worm 200A and worm 200B at the same time. Width W1 corresponds to width W3 of hole 202A of worm 200A. Width W3 is measured AF. Thus, when section 310 is engaged with hole 202A, tool 300 and worm 200A are non-rotatably connected. Width W2 corresponds to width W4 of hole 202B of worm 200B. Width W4 is measured AF. Thus, when section 320 is engaged with hole 202B, tool 300 and worm 200B are non-rotatably connected. It should be appreciated that tool 300 is only one example of a tool that can be used to expand and contract expandable intervertebral fusion implant 110, and that any tool suitable for rotating worm 200A and worm 200B, either at the same time or independently of each other, may be used. In some embodiments, worm 200A and worm 200B are rotated at different times (independently) or at different rates in order to achieve a non-parallel state of expandable intervertebral fusion implant 110 (i.e., surface 162 is non-parallel to surface 124).

In some embodiments, and as shown, section 310 further comprises through-bore 316 extending longitudinally from end 312 to end 314. Section 320 further comprises section 326 engaged with through-bore 316. Section 326 is fixedly secured to section 320, and sections 320 and 326 are rotatably connected to section 310. Section 326 may comprise a fitting in end 328 such as a hex head, Phillips head, torx head, etc. As such, section 320 can be rotated independent of section 310, and vice versa. This allows tool 300 to elevate the front and back of implant 110, 410, 610 independently to obtain lordosis by virtue of the pivotable connection of the superior and inferior components.

Figure 12:
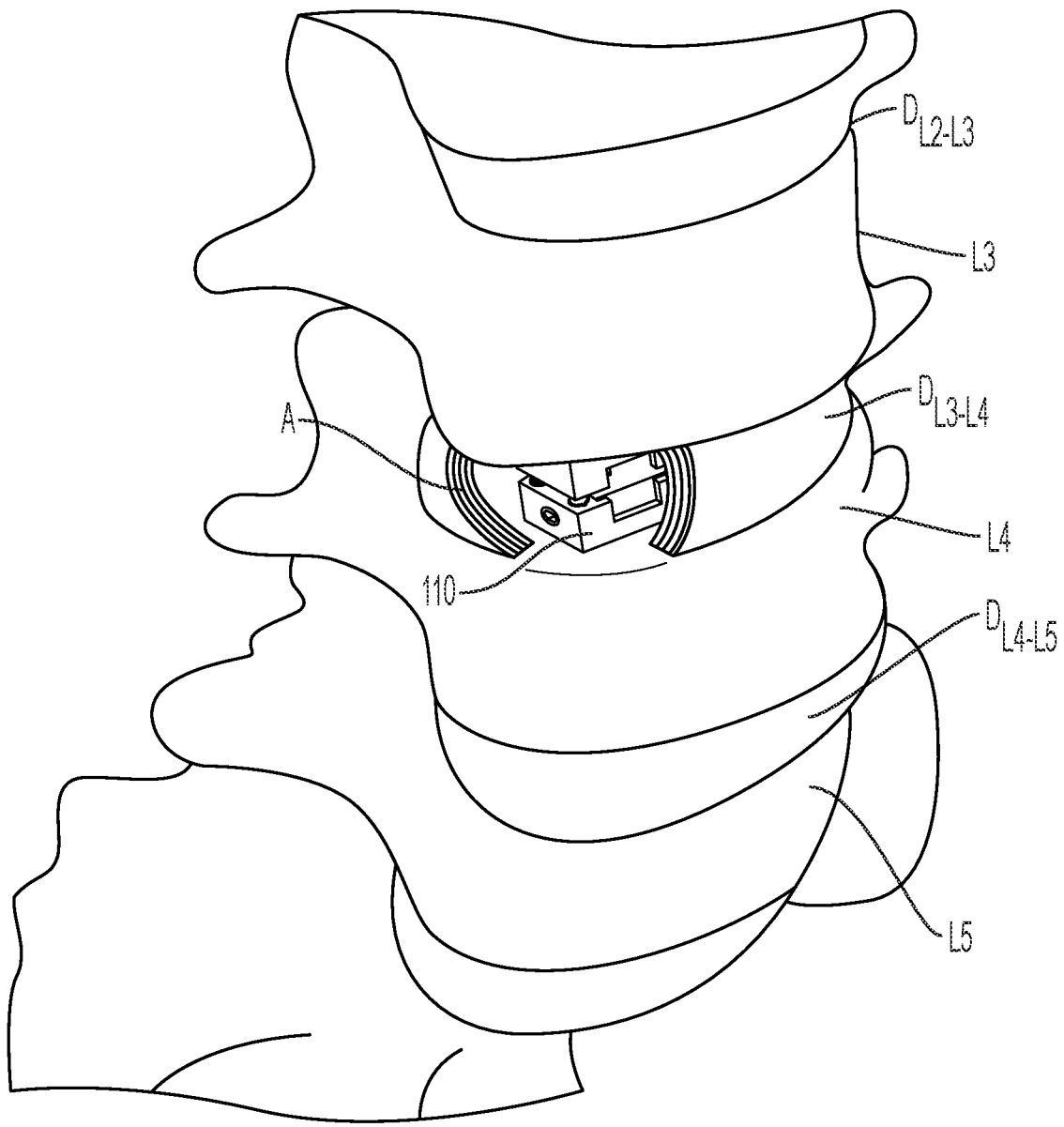
FIG. 12 is an anterior perspective view of a spinal column including the expandable intervertebral fusion implant shown in FIG. 7A, in an expanded state.

FIG. 12 is an anterior perspective view of a spinal column including expandable intervertebral fusion implant 110, in an expanded state. Expandable intervertebral fusion implant 110 is inserted into the spinal column between, for example, vertebra L3 and vertebra L4, or where disc $D_{L3-L4}$ should be. Expandable intervertebral fusion implant 110 is then vertically expanded until the desired height is reached. As previously described, expandable intervertebral implant 110 is expanded by rotating worm 200A and/or worm 200B. It should be appreciated that expandable intervertebral implant 110 may be expanded prior to insertion, or after insertion. Expandable intervertebral implant 110 is then filled with fusion material, for example, via hole 202A in worm 200A, and left in situ.

Figure 13:
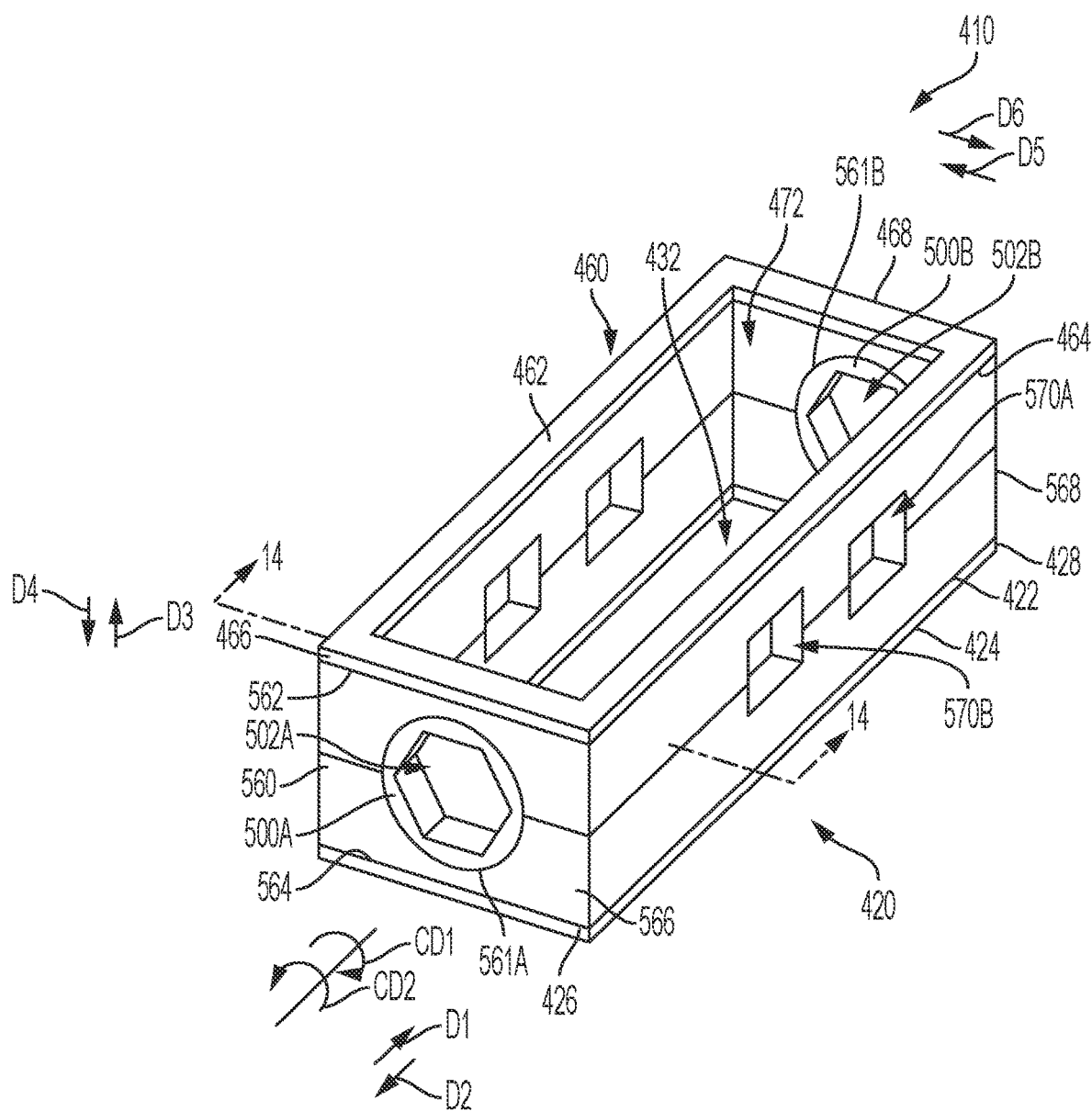
FIG. 13 is a perspective view of an expandable intervertebral fusion implant, in a collapsed state.
Figure 14A:
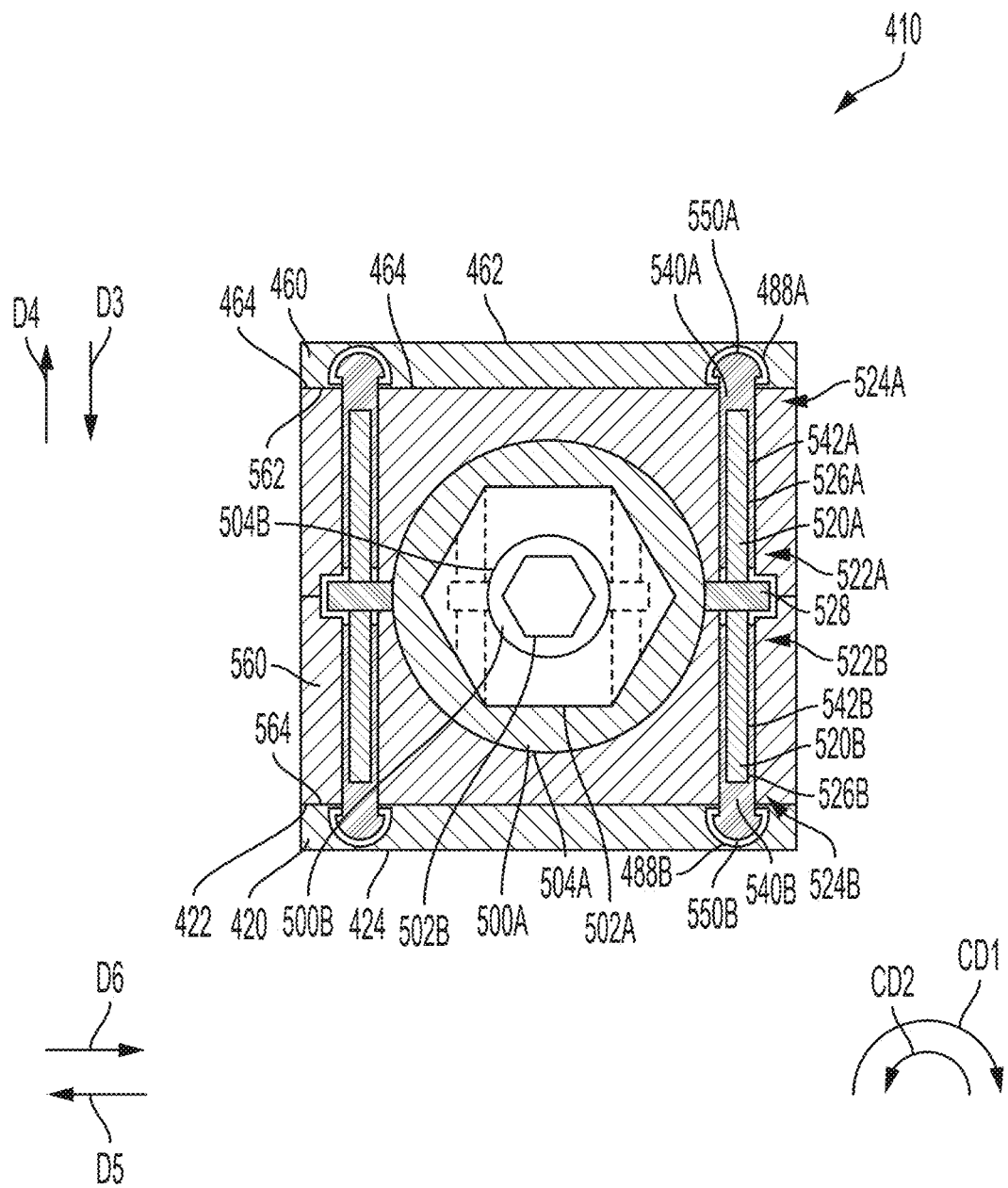
FIG. 14A is a cross-sectional view of the expandable intervertebral fusion implant taken generally along line 14-14 in FIG. 13.
Figure 14B:
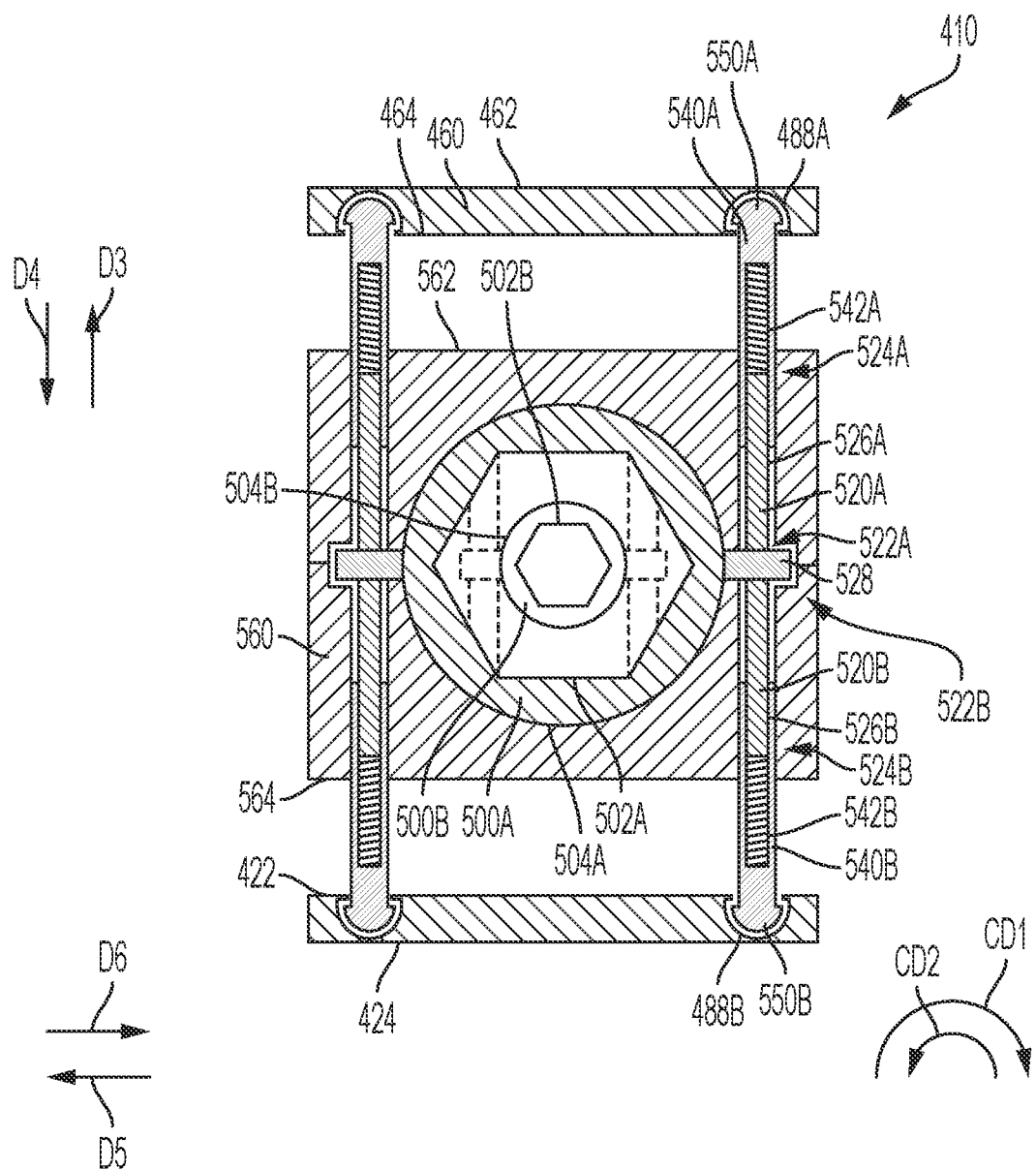
FIG. 14B is a cross-sectional view of the expandable intervertebral fusion implant taken generally along line 14-14 in FIG. 13, in an expanded state.

FIG. 13 is a perspective view of expandable intervertebral fusion implant 410, in a collapsed state. FIG. 14A is a cross-sectional view of expandable intervertebral fusion implant 410 taken generally along line 14-14 in FIG. 13. FIG. 14B is a cross-sectional view of expandable intervertebral fusion implant 410 taken generally along line 14-14 in FIG. 13, in an expanded state. Expandable intervertebral fusion implant 410 generally comprises inferior component 420, superior component 460, base or intermediate component 560, and at least one expansion mechanism, for example, a worm drive comprising worm 500A and/or worm 500B and screws 520A-B. The following description should be read in view of FIGS. 13-14B.

Base 560 comprises top surface 562, bottom surface 564, end 566, and end 568. Top surface 562 is an interior surface of expandable intervertebral fusion implant 410 that generally faces superior component 460 and is operatively arranged to engage and/or abut against surface 464. Bottom surface 564 is an interior surface of expandable intervertebral fusion implant 410 that generally faces inferior component 420 and is operatively arranged to engage and/or abut against surface 422. In some embodiments, surface 562 is arranged parallel to surface 564. In some embodiments, surface 562 is arranged nonparallel to surface 564. In some embodiments, surface 564 is curvilinear, for example, proximate end 568. In some embodiments, base 560 further comprises one or more apertures. For example, in some embodiments base 560 comprises holes 570A-B, which extend through base 560 in direction D5. Base 560 further comprises a hole, which extends from surface 562 to surface 564. These holes are operatively arranged to allow bone fusion material, which may be injected within expandable intervertebral fusion implant 410 once implanted within a spinal column, to engage adjacent vertebra thereby encouraging bony fusion. As such, it should be appreciated that any number of holes of any number of geometric shapes can be arranged in base 560.

In some embodiments, base 560 further comprises one or more holes in end 566 and/or end 568, for example holes 561A-B. In some embodiments, hole 561A extends from end 566 in direction D1 and is arranged to house worm 500A, as will be described in greater detail below. Hole 561B is arranged proximate end 568. Hole 561B is arranged to house worm 500B, as will be described in greater detail below. In some embodiments, hole 561B is equal in size (e.g., diameter) to hole 561A. In some embodiments, hole 561B is not equal in size to hole 561A. Hole 561A is operatively arranged to allow for the injection of bone material. As will be described in greater detail below, worm 500A is arranged in hole 561A and comprises through-hole 502A. Once expandable intervertebral fusion implant 410 is implanted, bone material can be injected therein via hole 502A. Hole 561B may allow for fusion in some embodiments wherein worm 500B comprises a through-hole (e.g., hole 502B is a through-hole).

Inferior component 420 comprises top surface 422, bottom surface 424, end 426, and end 428. Top surface 422 is an interior surface of expandable intervertebral fusion implant 410 that generally faces superior component 460, and base 560, and is operatively arranged to engage and/or abut against surface 564. Bottom surface 424 is an exterior surface of expandable intervertebral fusion implant 410 that generally faces away from superior component 460 and base 560 and is operatively arranged to engage and/or abut against a vertebra. In some embodiments, surface 422 is arranged parallel to surface 424. In some embodiments, surface 422 is arranged nonparallel to surface 424. In some embodiments, surface 424 is curvilinear, for example, proximate end 428.

In some embodiments, inferior component 420 comprises hole 432, which extends from surface 422 to surface 424. In some embodiments, hole 432 may instead be a plurality of holes, not just one. Holes 570A-B and 432 are operatively arranged to allow bone fusion material, which may be injected within expandable intervertebral fusion implant 410 once implanted within a spinal column, to engage adjacent vertebra thereby encouraging bony fusion. As such, it should be appreciated that any number of holes of any number of geometric shapes can be arranged in inferior component 420. Inferior component 420 further comprises one or more holes, for example holes 488B. In some embodiments, holes 488B are sockets and engage balls 550B to form a pivotable connection between screws 520B, and thus base 560, and inferior component 420, as will be described in greater detail below.

Superior component 460 comprises top surface 462, bottom surface 464, end 466, and end 468. Top surface 462 is an exterior surface of expandable intervertebral fusion implant 410 that generally faces away from inferior component 420 and base 560 and is operatively arranged to engage and/or abut against a vertebra. Bottom surface 464 is an interior surface of expandable intervertebral fusion implant 410 that generally faces inferior component 420, and base 560, and is operatively arranged to engage and/or abut against surface 562. In some embodiments, surface 462 is arranged parallel to surface 464. In some embodiments, surface 462 is arranged nonparallel to surface 464. In some embodiments, surface 464 is curvilinear, for example, proximate end 468.

In some embodiments, superior component 460 comprises hole 472, which extends from surface 462 to surface 464. In some embodiments, hole 472 may instead be a plurality of holes, not just one. Holes 570A-B and 472 are operatively arranged to allow bone fusion material, which may be injected within expandable intervertebral fusion implant 410 once implanted within a spinal column, to engage adjacent vertebra thereby encouraging bony fusion. As such, it should be appreciated that any number of holes of any number of geometric shapes can be arranged in superior component 460. Superior component 460 further comprises one or more holes, for example holes 488A. In some embodiments, holes 488A are sockets and engage balls 550A to form a pivotable connection between screws 520A, and thus base 560, and superior component 460, as will be described in greater detail below.

In some embodiments, screws 520A-B are non-rotatably connected to gears 528. Gears 528 and screws 520A-B are rotatably connected to base 560. Screw 520A extends at least partially through a hole in base 560 and comprises end 522A connected to gear 528 and end 524A threadably engaged with sleeve 540A. Sleeve 540A is slidably engaged with base 560, that is, sleeve 540A is displaceable in directions D3 and D4 with respect to base 560. Sleeve 540A comprises radially inward facing surface 542A having threading that engages threaded radially outward facing surface 526A of screw 520A. Sleeve 540A further comprises ball 550A pivotably engaged with socket 488A. It should be appreciated that sleeve 540A may be connected to superior component 460 in any suitable way, for example, bolts, rivets, adhesive, solder, welding, etc. In some embodiments, sleeve 540A may comprise a protrusion that engages a notch in the hole of base 560 to non-rotatably connect sleeve 540A to base 560.

Screw 520B extends at least partially through a hole in base 560 and comprises end 522B connected to gear 528 and end 524B threadably engaged with sleeve 540B. Sleeve 540B is slidably engaged with base 560, that is, sleeve 540B is displaceable in directions D3 and D4 with respect to base 560. Sleeve 540B comprises radially inward facing surface 542B having threading that engages threaded radially outward facing surface 526B of screw 520B. Sleeve 540B further comprises ball 550B pivotably engaged with socket 488B. It should be appreciated that sleeve 540B may be connected to inferior component 420 in any suitable way, for example, bolts, rivets, adhesive, solder, welding, etc. In some embodiments, sleeve 540B may comprise a protrusion that engages a notch in the hole of base 560 to non-rotatably connect sleeve 540B to base 560.

As gears 528 rotate in a first circumferential direction, screws 520A-B also rotate in the first circumferential direction, sleeve 540A and superior component 460 displace in direction D3 with respect to base 560, and sleeve 540B and inferior component 420 displace in direction D4 with respect to base 560. Thus, rotation of gears 528 in the first circumferential direction causes implant 410 to expand. As gears 528 rotate in a second circumferential direction, opposite the first circumferential direction, screws 520A-B also rotate in the second circumferential direction, sleeve 540A and superior component 460 displace in direction D4 with respect to base 560, and sleeve 540B and inferior component 420 displace in direction D3 with respect to base 560. Thus, rotation of gears 528 in the second circumferential direction causes implant 410 to collapse.

Worm 500A is generally cylindrical and comprises through-hole 502A and radially outward facing surface 504A. Radially outward facing surface 504A comprises threading arranged to engage gears 528. Worm 500B is generally cylindrical and comprises hole 502B and radially outward facing surface 504B. Radially outward facing surface 504B comprises threading arranged to engage gears 528 (on distal end 568). Worms 500A-B are rotatably connected to base 560 via holes 561A-B, respectively, meaning worms 500A-B are capable of displacing circumferentially with respect to base 560. Worms 500A-B are not capable of displacing axially, in directions D1 and D2, with respect to base 560. Through-hole 502A is operatively arranged to be engaged by a tool in order to rotate worm 500A, for example tool 300. Such head may comprise any drive type suitable for rotating worm 500A, 500B for example, Phillips and Frearson, slotted, combination, socked, internal hex, Allen, torx, external hex, etc. However, it should be appreciated that hole 502A is a through-hole that allows not only bone material to be injected into expandable intervertebral fusion implant 410, but also access to worm 500B. As worm 500A, 500B is rotated, for example in circumferential direction CD1 or circumferential direction CD2, threading of radially outward facing surface 504A, 504B engages teeth on gears 528 to displace screws 520A-B in circumferential direction CD3 or circumferential direction CD4, within base 560. This in turn causes implant 410 to expand and collapse as previously described. The engagement of worm 500A, 500B with gears 528 creates a worm drive. It should be appreciated that while the drawings illustrate only one worm 500A arranged to engage two gears 528 at the same time, in some embodiments expandable intervertebral fusion implant 410 may comprise two worms 500A that independently engage the two gears 528. Such an arrangement would allow for each corner (of end 566) to be expanded/contracted independently of each other. The same is true of worm 500B, wherein in some embodiments implant 410 comprises two worms 500B arranged to independently engage two gears 528.

Figure 15:
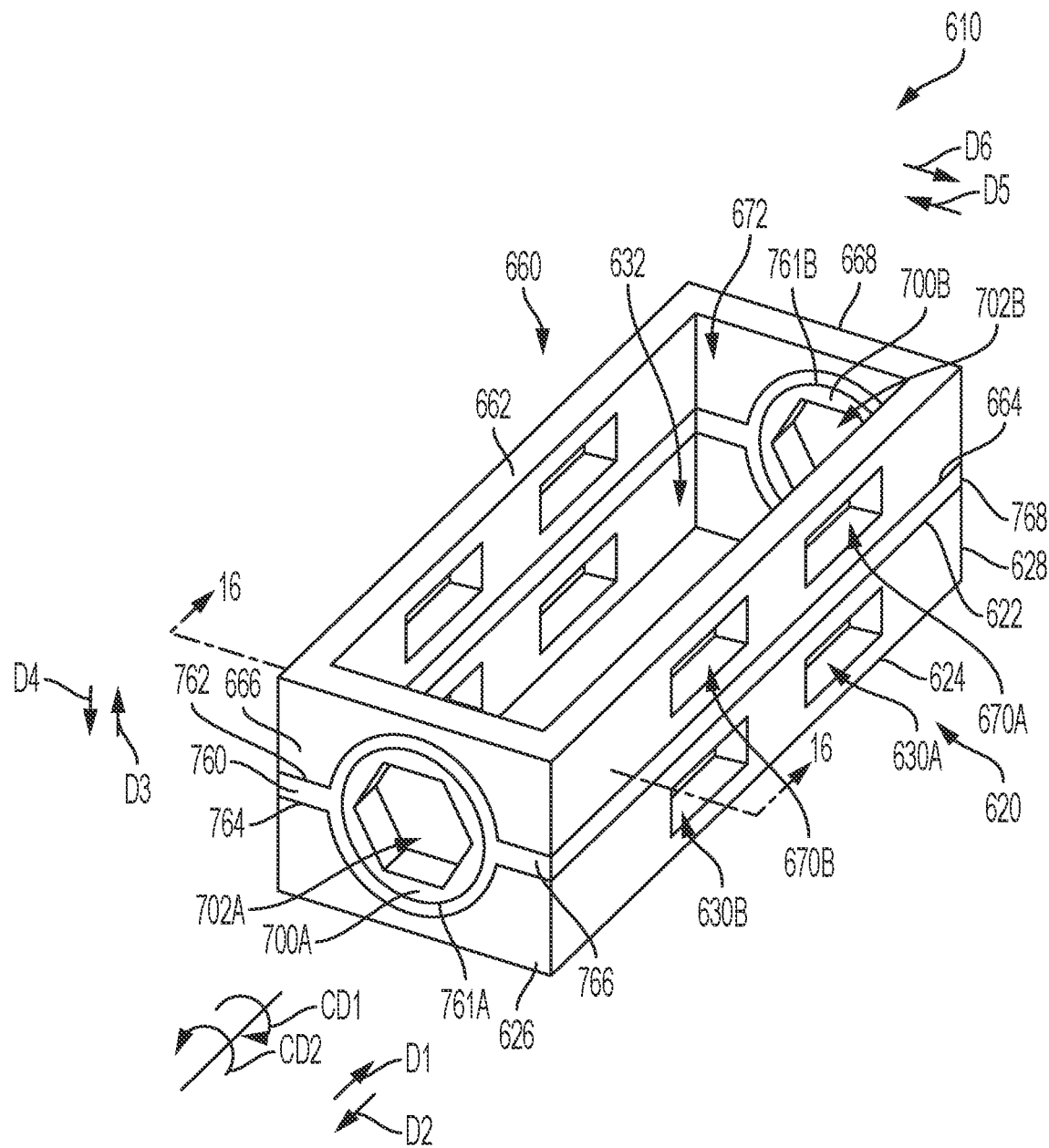
FIG. 15 is a perspective view of an expandable intervertebral fusion implant, in a collapsed state.
Figure 16A:
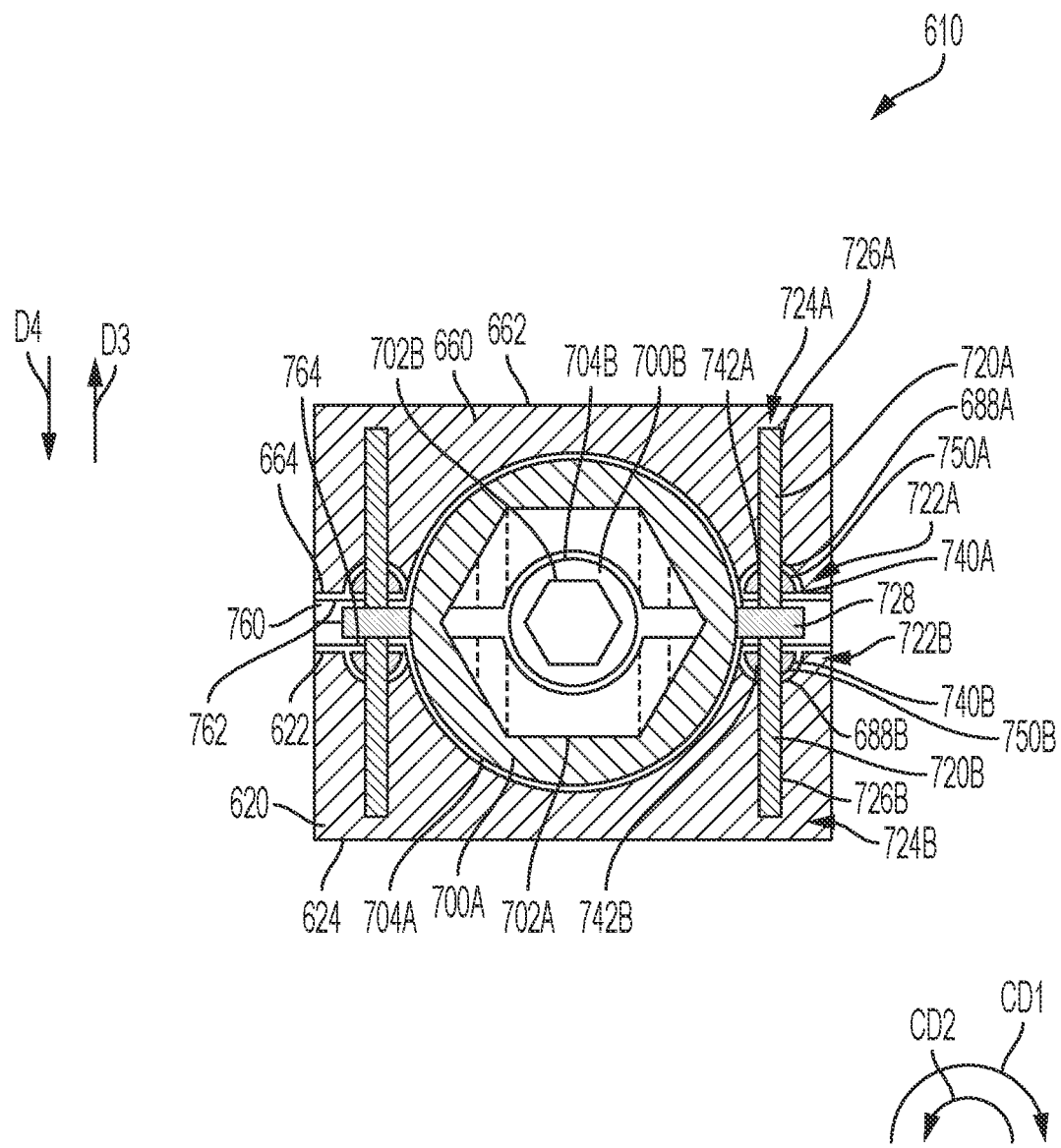
FIG. 16A is a cross-sectional view of the expandable intervertebral fusion implant taken generally along line 16-16 in FIG. 15; and, FIG. 16B is a cross-sectional view of the expandable intervertebral fusion implant taken generally along line 16-16 in FIG. 15, in an expanded state.
Figure 16B:
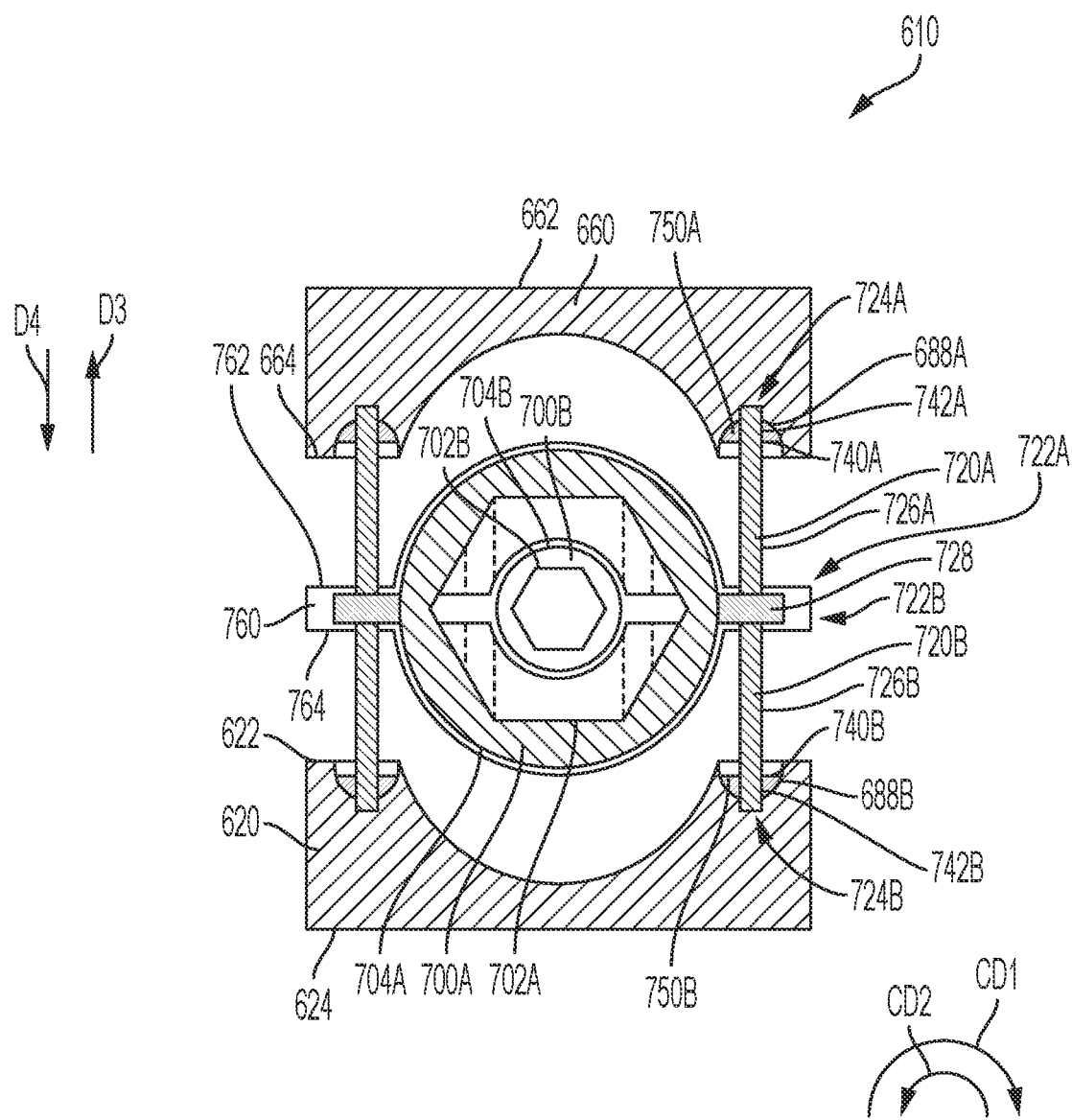

FIG. 15 is a perspective view of expandable intervertebral fusion implant 610, in a collapsed state. FIG. 16A is a cross-sectional view of expandable intervertebral fusion implant 610 taken generally along line 16-16 in FIG. 15. FIG. 16B is a cross-sectional view of expandable intervertebral fusion implant 610 taken generally along line 16-16 in FIG. 15, in an expanded state. Expandable intervertebral fusion implant 610 generally comprises inferior component 620, superior component 660, base or intermediate component 760, and at least one expansion mechanism, for example, a worm drive comprising worm 700A and/or worm 700B and screws 720A. The following description should be read in view of FIGS. 15-16B.

Base 760 comprises top surface 762, bottom surface 764, end 766, and end 768. Top surface 762 is an interior surface of expandable intervertebral fusion implant 610 that generally faces superior component 660 and is operatively arranged to engage and/or abut against surface 664. Bottom surface 764 is an interior surface of expandable intervertebral fusion implant 610 that generally faces inferior component 620 and is operatively arranged to engage and/or abut against surface 622. In some embodiments, surface 762 is arranged parallel to surface 764. In some embodiments, surface 762 is arranged nonparallel to surface 764. In some embodiments, surface 764 is curvilinear, for example, proximate end 768. In some embodiments, base 760 further comprises a hole, which extends from surface 762 to surface 764. This hole is operatively arranged to allow bone fusion material, which may be injected within expandable intervertebral fusion implant 610 once implanted within a spinal column, to engage adjacent vertebra thereby encouraging bony fusion. As such, it should be appreciated that any number of holes of any number of geometric shapes can be arranged in base 760.

In some embodiments, base 760 further comprises one or more holes in end 766 and/or end 768, for example holes 761A-B. In some embodiments, hole 761A extends from end 766 in direction D1 and is arranged to house worm 700A, as will be described in greater detail below. Hole 761B is arranged proximate end 768. Hole 761B is arranged to house worm 700B, as will be described in greater detail below. In some embodiments, hole 761B is equal in size (e.g., diameter) to hole 761A. In some embodiments, hole 761B is not equal in size to hole 761A. Hole 761A is operatively arranged to allow for the injection of bone material. As will be described in greater detail below, worm 700A is arranged in hole 761A and comprises through-hole 702A. Once expandable intervertebral fusion implant 610 is implanted, bone material can be injected therein via hole 702A. Hole 761B may allow for fusion in some embodiments wherein worm 700B comprises a through-hole (e.g., hole 702B is a through-hole).

Inferior component 620 comprises top surface 622, bottom surface 624, end 626, and end 628. Top surface 622 is an interior surface of expandable intervertebral fusion implant 610 that generally faces superior component 660, and base 760, and is operatively arranged to engage and/or abut against surface 764. Bottom surface 624 is an exterior surface of expandable intervertebral fusion implant 610 that generally faces away from superior component 660 and base 760 and is operatively arranged to engage and/or abut against a vertebra. In some embodiments, surface 622 is arranged parallel to surface 624. In some embodiments, surface 622 is arranged nonparallel to surface 624. In some embodiments, surface 624 is curvilinear, for example, proximate end 628.

In some embodiments, inferior component 620 comprises hole 632, which extends from surface 622 to surface 624. In some embodiments, hole 632 may instead be a plurality of holes, not just one. In some embodiments, inferior component 620 comprises one or more holes, for example, holes 630A-B, which extend through inferior component 620 in direction D5. Holes 630A-B and 632 are operatively arranged to allow bone fusion material, which may be injected within expandable intervertebral fusion implant 610 once implanted within a spinal column, to engage adjacent vertebra thereby encouraging bony fusion. As such, it should be appreciated that any number of holes of any number of geometric shapes can be arranged in inferior component 620. Inferior component 620 further comprises one or more holes, for example holes 688B. In some embodiments, holes 688B are sockets and engage balls 750B to form a pivotable connection between screws 720B, and thus base 760, and inferior component 620, as will be described in greater detail below.

Superior component 660 comprises top surface 662, bottom surface 664, end 666, and end 668. Top surface 662 is an exterior surface of expandable intervertebral fusion implant 610 that generally faces away from inferior component 620 and base 660 and is operatively arranged to engage and/or abut against a vertebra. Bottom surface 664 is an interior surface of expandable intervertebral fusion implant 610 that generally faces inferior component 620, and base 760, and is operatively arranged to engage and/or abut against surface 762. In some embodiments, surface 662 is arranged parallel to surface 664. In some embodiments, surface 662 is arranged nonparallel to surface 664. In some embodiments, surface 664 is curvilinear, for example, proximate end 668.

In some embodiments, superior component 660 comprises hole 672, which extends from surface 662 to surface 664. In some embodiments, hole 672 may instead be a plurality of holes, not just one. In some embodiments, superior component 660 comprises one or more holes, for example, holes 670A-B, which extend through superior component 660 in direction D5. Holes 670A-B and 672 are operatively arranged to allow bone fusion material, which may be injected within expandable intervertebral fusion implant 610 once implanted within a spinal column, to engage adjacent vertebra thereby encouraging bony fusion. As such, it should be appreciated that any number of holes of any number of geometric shapes can be arranged in superior component 660. Superior component 660 further comprises one or more holes, for example holes 688A. In some embodiments, holes 688A are sockets and engage balls 750A to form a pivotable connection between screws 720A, and thus base 760, and superior component 660, as will be described in greater detail below.

In some embodiments, screws 720A-B are non-rotatably connected to gears 728. Gears 728 and screws 720A-B are rotatably connected to base 760. Screw 720A extends at least partially through a hole in base 760 and comprises end 722A connected to gear 728 and end 724A. End 724A slidingly engages superior component 660 and threadably engages nut 740A. Nut 740A is slidably engaged with base 760, that is, nut 740A is displaceable in directions D3 and D4 with respect to base 760. Nut 740A comprises radially inward facing surface 742A having threading that engages threaded radially outward facing surface 726A of screw 720A. Nut 740A further comprises ball or dome 750A pivotably engaged with socket 688A. In some embodiments, dome 750A is an at least partially spherical surface of nut 740A. Dome 750A is slidingly engaged with socket or domed hole 688A. Frictional engagement between dome 750A and socket 688A prevents nut 740A from rotating as screw 720A rotates. It should be appreciated that nut 740A may be connected to superior component 660 in any suitable way, for example, bolts, rivets, adhesive, solder, welding, etc.

Screw 720B extends at least partially through a hole in base 760 and comprises end 722B connected to gear 728 and end 724B. End 724B slidingly engages inferior component 620 and threadably engages nut 740B. Nut 740B is slidably engaged with base 760, that is, nut 740B is displaceable in directions D3 and D4 with respect to base 760. Nut 740B comprises radially inward facing surface 742B having threading that engages threaded radially outward facing surface 726B of screw 720B. Nut 740B further comprises ball or dome 750B pivotably engaged with socket 688B. In some embodiments, dome 750B is an at least partially spherical surface of nut 740B. Dome 750B is slidingly engaged with socket or domed hole 688B. Frictional engagement between dome 750B and socket 688B prevents nut 740B from rotating as screw 720B rotates. It should be appreciated that nut 740B may be connected to inferior component 620 in any suitable way, for example, bolts, rivets, adhesive, solder, welding, etc.

As gears 728 rotate in a first circumferential direction, screws 720A-B also rotate in the first circumferential direction, nuts 740A and superior component 460 displace in direction D3 with respect to base 760, and nuts 740B and inferior component 420 displace in direction D4 with respect to base 760. Thus, rotation of gears 728 in the first circumferential direction causes implant 610 to expand. As gears 728 rotate in a second circumferential direction, opposite the first circumferential direction, screws 720A-B also rotate in the second circumferential direction, nuts 740A and superior component 660 displace in direction D4 with respect to base 760, and nuts 740B and inferior component 620 displace in direction D3 with respect to base 760. Thus, rotation of gears 728 in the second circumferential direction causes implant 610 to collapse.

Worm 700A is generally cylindrical and comprises through-hole 702A and radially outward facing surface 704A. Radially outward facing surface 704A comprises threading arranged to engage gears 728. Worm 700B is generally cylindrical and comprises hole 702B and radially outward facing surface 704B. Radially outward facing surface 704B comprises threading arranged to engage gears 728 (on distal end 768). Worms 700A-B are rotatably connected to base 760 via holes 761A-B, respectively, meaning worms 700A-B are capable of displacing circumferentially with respect to base 760. Worms 700A-B are not capable of displacing axially, in directions D1 and D2, with respect to base 760. Through-hole 702A is operatively arranged to be engaged by a tool in order to rotate worm 700A, for example tool 300. Such head may comprise any drive type suitable for rotating worm 700A, 700B for example, Phillips and Frearson, slotted, combination, socked, internal hex, Allen, torx, external hex, etc. However, it should be appreciated that hole 702A is a through-hole that allows not only bone material to be injected into expandable intervertebral fusion implant 610, but also access to worm 700B. As worm 700A, 700B is rotated, for example in circumferential direction CD1 or circumferential direction CD2, threading of radially outward facing surface 704A, 704B engages teeth on gears 728 to displace screws 720A-B in circumferential direction CD3 or circumferential direction CD4, within base 760. This in turn causes implant 610 to expand and collapse as previously described. The engagement of worm 700A, 700B with gears 728 creates a worm drive. It should be appreciated that while the drawings illustrate only one worm 700A arranged to engage two gears 728 at the same time, in some embodiments expandable intervertebral fusion implant 610 may comprise two worms 700A that independently engage the two gears 728. Such an arrangement would allow for each corner (of end 766) to be expanded/contracted independently of each other. The same is true of worm 700B, wherein in some embodiments implant 610 comprises two worms 700B arranged to independently engage two gears 728.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Spinal column
12 Ligament
C1-C7 Cervical vertebrae
T1-T12 Thoracic vertebrae
L1-L5 Lumbar vertebrae
S Sacrum
C Coccyx
$D_{L1-L2}$ Disc
$D_{L2-L3}$ Disc
$D_{L3-L4}$ Disc
$D_{L4-L5}$ Disc
F Facet
FJ Facet joint
SP Spinous process
TP Transverse process
IF Intervertebral foramen
NC Neural canal
A Annulus
N Nucleus
DH Disc space height
110 Expandable intervertebral fusion implant
120 Inferior component
121A Hole
121B Hole
122 Surface
124 Surface
126 End
128 End
130A Hole
130B Hole
132 Hole
134A Section
134B Section
142A Hole
142B Hole
144A Notch
144B Notch
160 Superior component
162 Surface
164 Surface
166 End
168 End
170A Hole 170B Hole
172 Hole
174A Groove
174B Groove
182A Hole
182B Hole
184A Surface
184B Surface
186A Surface
186B Surface
188A Socket
188B Socket
200A Worm
200B Worm
202A Hole
202B Hole
204A Radially outward facing surface
204B Radially outward facing surface
220A Screw
220B Screw
222A End
222B End
224A End
224B End
226A Radially outward facing surface
226B Radially outward facing surface
228A Bevel gear
228B Bevel gear
240A Sleeve
240B Sleeve
242A Radially inward facing surface
242B Radially inward facing surface
244A Protrusion
244B Protrusion
250A Ball
250B Ball
300 Tool
310 Section
312 End
314 End
316 Through-bore
320 Section
322 End
324 End
326 Section
328 End
410 Expandable intervertebral fusion implant
420 Inferior component
422 Surface
424 Surface
426 End
428 End
432 Hole
460 Superior component
462 Surface
464 Surface
466 End
468 End
472 Hole
488A Hole or socket
488B Hole or socket
500A Worm
500B Worm
502A Hole
502B Hole
504A Radially outward facing surface
504B Radially outward facing surface
520A Screw
520B Screw
522A End
522B End
524A End
524B End
526A Radially outward facing surface
526B Radially outward facing surface
528 Gear
540A Sleeve
540B Sleeve
542A Radially inward facing surface
542B Radially inward facing surface
550A Ball
550B Ball
560 Base or intermediate component
561A Hole
561B Hole
562 Surface
564 Surface
566 End
568 End
570A Hole
570B Hole
610 Expandable intervertebral fusion implant
620 Inferior component
622 Surface
624 Surface
626 End
628 End
630A Hole
630B Hole
632 Hole
660 Superior component
662 Surface
664 Surface
666 End
668 End
670A Hole
670B Hole
672 Hole
688A Socket
688B Socket
700A Worm
700B Worm
702A Hole
702B Hole
704A Radially outward facing surface
704B Radially outward facing surface
720A Screw
720B Screw
722A End
722B End
724A End
724B End
726A Radially outward facing surface
726B Radially outward facing surface
728 Gear
740A Nut
740B Nut
742A Radially inward facing surface
742B Radially inward facing surface
750A Ball or dome
750B Ball or dome
760 Base or intermediate component
762 Surface
764 Surface 766 End
768 End
CD1 Circumferential direction
CD2 Circumferential direction
CD3 Circumferential direction
CD4 Circumferential direction
D1 Direction
D2 Direction
D3 Direction
D4 Direction
D5 Direction
D6 Direction
W1 Width
W2 Width
W3 Width
W4 Width

What is claimed is:

1. An expandable intervertebral fusion implant, comprising:
   a base, including:
      a first top surface;
      a first bottom surface;
      a first end including a first worm rotatably arranged therein, the first worm comprising a radially outward facing surface comprising threading; and
      a second end including a second worm rotatably arranged therein;
   an inferior component, including:
      a second top surface operatively arranged to engage the first bottom surface; and
      a second bottom surface;
   a superior component, including:
      a third top surface;
      a third bottom surface operatively arranged to engage the first top surface; and
   a first expansion mechanism, including:
      a first screw comprising a first bottom end connected to the base and a first top end connected to the superior component;
      a gear engaged with the threading; and
      a second screw comprising a second bottom end connected to the inferior component and a second top end connected to the base;
   wherein as the first worm is rotated in a first circumferential direction, the first screw and the second screw rotate in a second circumferential direction and the superior component and the inferior component are displaced relative to the base.

2. The expandable intervertebral fusion implant as recited in claim 1, wherein the first expansion mechanism further comprises a first sleeve threadably engaged with the first worm.

3. The expandable intervertebral fusion implant as recited in claim 2, wherein as the first screw rotates in the second circumferential direction, the first sleeve displaces relative to the base.

4. The expandable intervertebral fusion implant as recited in claim 2, wherein the first sleeve is pivotably connected to the superior component.

5. The expandable intervertebral fusion implant as recited in claim 2, wherein the first expansion mechanism further comprises a second sleeve threadably engaged with the first worm.

6. The expandable intervertebral fusion implant as recited in claim 5, wherein the second sleeve is pivotably connected to the inferior component.

7. The expandable intervertebral fusion implant as recited in claim 1, wherein the second worm is spaced apart from the first worm.

8. The expandable intervertebral fusion implant as recited in claim 1, wherein the first worm comprises a through-hole.

9. The expandable intervertebral fusion implant as recited in claim 1, further comprising a second expansion mechanism including:
   a third screw comprising a third bottom end connected to the base and a third top end connected to the superior component; and
   a fourth screw comprising a fourth bottom end connected to the inferior component and a fourth top end connected to the base.

10. The expandable intervertebral fusion implant as recited in claim 9, wherein as the second worm is rotated in the first circumferential direction, the third screw and the fourth screw rotate in the second circumferential direction and the superior component and the inferior component are displaced relative to the base.

11. The expandable intervertebral fusion implant as recited in claim 1, wherein the first worm and the second worm are concentrically aligned.

12. The expandable intervertebral fusion implant as recited in claim 1, further comprising a nut threadably engaged with the first screw, wherein the nut comprises a dome.

13. The expandable intervertebral fusion implant as recited in claim 12, wherein as the first screw rotates in the second circumferential direction, the nut displaces relative to the base.

14. An expandable intervertebral fusion implant, comprising:
   an inferior component, including:
      a first top surface;
      a first bottom surface;
      a first end; and
      a second end;
   a superior component, including:
      a second top surface;
      a second bottom surface;
      a third end; and
      a fourth end;
   a first worm arranged between the inferior component and the superior component;
   a second worm concentrically aligned with the first worm and arranged between the inferior component and the superior component;
   an expansion mechanism, including:
      a first screw comprising a first bottom end connected to the first worm and a first top end connected to the superior component, wherein the first top end is pivotably connected to the superior component; and
      a second screw comprising a second bottom end connected to the inferior component and a second top end connected to the first worm, the second screw being non-rotatably connected to the first screw;
   wherein as the first worm is rotated in a first circumferential direction, the first screw and the second screw rotate in a second circumferential direction and the superior component is displaced relative to the inferior component.

15. The expandable intervertebral fusion implant as recited in claim 14, wherein:
   the first worm comprises a radially outward facing surface comprising threading; and the expansion mechanism further comprises a gear non-rotatably connected to the first screw and the second screw and engaged with the threading.

16. The expandable intervertebral fusion implant as recited in claim 14, wherein:
the expansion mechanism further comprises a sleeve threadably engaged with the first worm; and
as the first worm rotates in the first circumferential direction, the sleeve displaces axially relative to the first screw.

17. The expandable intervertebral fusion implant as recited in claim 14, wherein the second top end is pivotably connected to the inferior component.

18. The expandable intervertebral fusion implant as recited in claim 14, wherein:
the expansion mechanism further comprises a nut threadably engaged with the first worm; and
the nut comprises a dome.

19. An expandable intervertebral fusion implant, comprising:
a base;
an inferior component arranged on a first side of the base;
a superior component arranged on a second side of the base, opposite the first side;
a first worm rotatably arranged in the base and including a through-hole;
a second worm rotatably arranged in the base, the second worm concentrically aligned with and spaced apart from the first worm; and
an expansion mechanism, including:
a first screw extending between the base and the superior component; and
a second screw non-rotatably connected to the first screw and extending between the base and the inferior component;
wherein as the first worm is rotated in a first circumferential direction, the first screw and the second screw rotate in a second circumferential direction and the inferior component and the superior component are displaced relative to the base.

* * * * *